(12) United States Patent
Bar-Zeev et al.

(10) Patent No.: US 9,292,973 B2
(45) Date of Patent: Mar. 22, 2016

(54) AUTOMATIC VARIABLE VIRTUAL FOCUS FOR AUGMENTED REALITY DISPLAYS

(75) Inventors: Avi Bar-Zeev, Redmond, WA (US); John Lewis, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 341 days.

(21) Appl. No.: 12/941,825

(22) Filed: Nov. 8, 2010

(65) Prior Publication Data

US 2012/0113092 A1 May 10, 2012

(51) Int. Cl.
G06T 19/00 (2011.01)
G06F 3/01 (2006.01)
G02B 27/01 (2006.01)

(52) U.S. Cl.
CPC ............ G06T 19/006 (2013.01); G02B 27/017 (2013.01); G06F 3/012 (2013.01); G06F 3/013 (2013.01); *G02B 2027/014* (2013.01); *G02B 2027/0127* (2013.01); *G02B 2027/0134* (2013.01); *G02B 2027/0138* (2013.01); *G02B 2027/0187* (2013.01)

(58) Field of Classification Search
USPC ......................................................... 345/633
See application file for complete search history.

(56) References Cited

U.S. PATENT DOCUMENTS

| | | | |
|---|---|---|---|
| 4,041,505 A | 8/1977 | Hartmann | |
| 4,274,101 A | 6/1981 | Kataoka et al. | |
| 4,934,773 A | 6/1990 | Becker | |
| 5,307,170 A | 4/1994 | Itsumi et al. | |
| 5,416,876 A | 5/1995 | Ansley et al. | |
| 5,486,860 A | 1/1996 | Shiokawa et al. | |
| 6,053,610 A | 4/2000 | Kurtin et al. | |
| 6,069,742 A | 5/2000 | Silver | |
| 6,317,127 B1 * | 11/2001 | Daily et al. | ............. 345/629 |
| 6,351,335 B1 * | 2/2002 | Perlin | ..................... 359/618 |

(Continued)

FOREIGN PATENT DOCUMENTS

| | | |
|---|---|---|
| CN | 101268388 A | 9/2008 |
| CN | 101634750 A | 1/2010 |

(Continued)

OTHER PUBLICATIONS

Akeley et al. "A Stereo Display Prototype with Multiple Focal Distances," Proceedings of ACM SIGGRAPH, Aug., 2004, pp. 804-813. ACM, Inc: New York, NY, USA.

(Continued)

*Primary Examiner* — Said Broome
(74) *Attorney, Agent, or Firm* — Micah Goldsmith; Judy Yee; Micky Minhas

(57) ABSTRACT

The technology provides an augmented reality display system for displaying a virtual object to be in focus when viewed by a user. In one embodiment, the focal region of the user is tracked, and a virtual object within the user focal region is displayed to appear in the focal region. As the user changes focus between virtual objects, they appear to naturally move in and out of focus as real objects would in a physical environment. The change of focus for the virtual object images is caused by changing a focal region of light processing elements in an optical path of a microdisplay assembly of the augmented reality display system. In some embodiments, a range of focal regions are swept through at a sweep rate by adjusting the elements in the optical path of the microdisplay assembly.

17 Claims, 20 Drawing Sheets

(56) References Cited

U.S. PATENT DOCUMENTS

| | | | |
|---|---|---|---|
| 6,408,257 | B1* | 6/2002 | Harrington et al. ............ 702/150 |
| 6,522,479 | B2 | 2/2003 | Yahagi |
| 6,618,208 | B1 | 9/2003 | Silver |
| 6,886,137 | B2 | 4/2005 | Peck et al. |
| 6,898,307 | B1* | 5/2005 | Harrington ................... 382/154 |
| 7,133,077 | B2 | 11/2006 | Higuma et al. |
| 7,262,926 | B2 | 8/2007 | Ohsato |
| 7,362,522 | B2 | 4/2008 | Ohsato |
| 7,457,434 | B2 | 11/2008 | Azar |
| 7,542,012 | B2* | 6/2009 | Kato et al. ......................... 345/8 |
| 7,686,451 | B2 | 3/2010 | Cleveland |
| 8,262,234 | B2* | 9/2012 | Watanabe ..................... 353/101 |
| 8,941,559 | B2* | 1/2015 | Bar-Zeev ............. G02B 26/026 345/204 |
| 2001/0001240 | A1* | 5/2001 | Melville et al. .................. 345/32 |
| 2002/0126066 | A1 | 9/2002 | Yasukawa et al. |
| 2002/0167462 | A1* | 11/2002 | Lewis et al. ........................ 345/7 |
| 2003/0197933 | A1 | 10/2003 | Sudo et al. |
| 2004/0130783 | A1* | 7/2004 | Solomon ........................ 359/462 |
| 2005/0090730 | A1* | 4/2005 | Cortinovis .............. F16D 51/50 600/407 |
| 2006/0028400 | A1 | 2/2006 | Lapstun et al. |
| 2006/0033992 | A1* | 2/2006 | Solomon ........................ 359/462 |
| 2006/0077121 | A1 | 4/2006 | Melville et al. |
| 2006/0146012 | A1 | 7/2006 | Arneson et al. |
| 2006/0250322 | A1 | 11/2006 | Hall et al. |
| 2006/0284790 | A1* | 12/2006 | Tegreene et al. ................... 345/7 |
| 2007/0273610 | A1* | 11/2007 | Baillot .............................. 345/8 |
| 2008/0007689 | A1 | 1/2008 | Silver |
| 2008/0084532 | A1 | 4/2008 | Kurtin |
| 2008/0117289 | A1* | 5/2008 | Schowengerdt et al. ........ 348/46 |
| 2008/0181452 | A1 | 7/2008 | Kwon et al. |
| 2008/0285140 | A1 | 11/2008 | Amitai |
| 2009/0112469 | A1 | 4/2009 | Lapidot et al. |
| 2009/0295683 | A1* | 12/2009 | Pugh et al. ......................... 345/9 |
| 2010/0097580 | A1 | 4/2010 | Yamamoto et al. |
| 2010/0103175 | A1 | 4/2010 | Okutomi et al. |
| 2010/0231706 | A1 | 9/2010 | Maguire, Jr. |
| 2010/0238161 | A1* | 9/2010 | Varga et al. ..................... 345/419 |
| 2011/0018903 | A1 | 1/2011 | Lapstun et al. |
| 2011/0075257 | A1* | 3/2011 | Hua et al. ....................... 359/464 |
| 2012/0105486 | A1 | 5/2012 | Lankford et al. |
| 2012/0127062 | A1 | 5/2012 | Bar-Zeev et al. |
| 2013/0107021 | A1 | 5/2013 | Maizels et al. |

FOREIGN PATENT DOCUMENTS

| | | |
|---|---|---|
| JP | H02262112 A | 10/1990 |
| JP | 2001078234 A | 3/2001 |
| JP | 2001197522 A | 7/2001 |
| JP | 2001215441 A | 8/2001 |
| JP | 2001242370 A | 9/2001 |
| JP | 2002176661 A | 6/2002 |
| JP | 2002199747 | 7/2002 |
| JP | 2002529792 A | 9/2002 |
| JP | 2003141522 | 5/2003 |
| JP | 2005208255 A | 8/2005 |
| JP | 2005351967 A | 12/2005 |
| JP | 3872100 B2 | 1/2007 |
| JP | 2008508621 A | 3/2008 |
| JP | 2008509438 A | 3/2008 |
| JP | 2010501890 A | 1/2010 |
| JP | 2010032759 A | 2/2010 |
| JP | 2010139575 | 6/2010 |
| JP | 2010139901 | 6/2010 |
| JP | 5237268 B2 | 3/2013 |
| KR | 1020030054603 | 7/2003 |
| KR | 1020090053838 | 5/2009 |
| WO | 2006017771 A1 | 2/2006 |
| WO | 2006087709 A1 | 8/2006 |
| WO | 2007063306 A2 | 6/2007 |
| WO | 2008024071 A1 | 2/2008 |
| WO | 2009096325 A1 | 8/2009 |
| WO | 2010090144 A1 | 8/2010 |

OTHER PUBLICATIONS

Blum, et al. "The Effect of Out-of-focus Blur on Visual Discomfort When Using Stereo Displays." Proceedings of the 2010 International Symposium on Mixed and Augmented Reality. Oct. 13-16, 2010, pp. 13-17. IEEE: Seoul, Korea.

Chen et al., "Research on Eye-gaze Tracking Network Generated by Augmented Reality Application," Proceedings of the Second International Workshop on Knowledge Discovery and Data Mining, Jan. 23-25, 2009, pp. 594-597. IEEE, Moscow, Russia.

"Helmet Mounted Display (HMD) with Built-In Eye Tracker." Datasheet. National Aerospace Laboratory (NLR), Jan. 2009, pp. 1-4. Retrieved from the Internet: URL: <http://www.nlr.nl/ATTS/flyer%20HMD%20F294-03.pdf>.

Hillaire et al. "Using an Eye-Tracking System to Improve Camera Motions and Depth-of-Field Blur Effects in Virtual Environments." Proceedings of the 2008 Virtual Reality Conference, Mar. 8-12, 2008, pp. 47-50. IEEE: Reno, NE, USA. Retrieved from the Internet Nov. 11, 2010, URL: <http://www.irisa.fr/bunraku/GENS/alecuyer/vr08_hillaire.pdf> 4 pages.

Johnson, Joel. "How Oil-Filled Lenses are Bringing Sight to Those in Need." Gizmodo [online]. Feb. 3, 2010, Gawker Media, New York, NY, USA. Retrieved from the Internet Nov. 11, 2010, URL: <http://gizmodo.com/5463368/how-oil+filled-lenses-are-bringing-sight-to-those-in-need> 4 pages.

Kim et al. "Vision-Based Eye-Gaze Tracking for Human Computer Interface." Proceedings of the 1999 Conference on Systems, Man, and Cybernetics, Oct. 12-15, 1999, pp. 324-329, vol. 2. IEEE: Toyko, Japan.

Kobayashi, et al. "Viewing and Reviewing How Humanoids Sensed, Planned and Behaved with Mixed Reality Technology." Proceedings of the 7th IEEE-RAX International Conference on Humanoid Robots, Nov. 29-Dec. 1, 2007, pp. 130-135. IEEE, Pittsburgh, PA, USA.

Lee et al. "Robust Gaze Tracking Method for Stereoscopic Virtual Reality Systems", J. Jacko (Ed.). Proceedings of the 12th international conference on Human-computer interaction: intelligent multimodal interaction environments (HCI'07), Jul. 22-27, 2007, pp. 700-709. Retrieved from the Internet: URL: <http://delivery.acm.org/10.1145/1770000/1769669/p700-lee.pdf?key1=1769669&key2=3272740821&coll=GUIDE&dl=GUIDE&CFID=98778950&CFTOKEN=13851951>.

Liu, Ruian, Shijiu Jin and Xiaorong Wu. "Real Time Auto-Focus Algorithm for Eye Gaze Tracking System." Proceedings of the 2007 International Symposium on Intelligent Signal Processing and Communication Systems. Nov. 28-Dec. 1, 2007, pp. 742-745, Xiamen, China.

Parviz, Babak A. "Augmented Reality in a Contact Lens." IEEE Spectrum: inside technology. Sep. 2009, pp. 1-14. Retrieved from the Internet on Jul. 29, 2010: URL: <http://spectrum.ieee.org/biomedical/bionics/augmented-reality-in-a-contact-lens>.

Ren, et al. "Tunable-focus liquid lens controlled using a servo motor." Optics Express, Sep. 4, 2006, pp. 8031-8036, vol. 14, No. 18. Optical Society of America: Washington, D.C., USA.

Rolland, Jannick and Hong Hua. "Displays—Head-Mounted." In Encyclopedia of Optical Engineering. New York: Marcel Dekker, 2005. Retrieved from the Internet on Nov. 11, 2010: URL: <http://www.optics.arizona.edu/opti588/reading/HMD_Rolland_Hua_2005.pdf> 16 pages.

Shachtman, Noah. "Pentagon: 'Augment' Reality with 'Videogame' Contact Lenses (Updated)." Wired [online]. Mar. 20, 2008, pp. 1-10. Retrieved from the Internet on Jul. 29, 2010: URL: <http://www.wired.com/dangerroom/2008/03/darpa-wants-con/>.

"Vibrating Lens Gives Movie Camera Great Depth of Focus." Popular Science. May, 1942, pp. 88-89, vol. 140, No. 5. Popular Science Publishing Co., Inc.: New York, NY, USA. Retrieved from the Internet on Sep. 29, 2000: URL: <http://books.google.com/> with search terms "vibrating" and "lens" 3 pages.

U.S. Appl. No. 12/949,650, filed Nov. 18, 2010.

English abstract for KR1020030054603 published Jul. 2, 2003.

English abstract for KR1020090053838 published May 27, 2009.

(56) References Cited

OTHER PUBLICATIONS

International Search Report and Written Opinion dated Apr. 24, 2012 in International Patent Application No. PCT/US2011/059007, 8 pages.
International Preliminary Report on Patentability and Written Opinion dated May 21, 2013 in International Patent Application No. PCT/US2011/059007, 6 pages.
International Search Report and Written Opinion dated Apr. 24, 2012 in International Patent Application No. PCT/U52011/058604, 8 pages.
International Preliminary Report on Patentability and Written Opinion dated May 14, 2013 in International Patent Application No. PCT/US2011/058604, 6 pages.
Response to Office Action filed Jun. 9, 2014 in European Patent Application No. 118401645, 27 pages.
Response to Office Action filed May 13, 2014 in Chinese Patent Application No. 201110364954.7, with English Summary of the Response and English translation of the pending Claims, 7 pages.
Communication under Rule 71(3) EPC indicating intention to grant a European patent Dated Aug. 6, 2014 in European Patent Application No. 11842082.7, 7 pages.
Office Action dated Jan. 3, 2014 in Chinese Patent Application No. 201110364954.7, with partial English language translation, 13 pages.
Search Report dated Feb. 20, 2014 in European Patent Application No. 118401645, 3 pages.
Examination Report dated Mar. 10, 2014 in European Patent Application No. 118401645, 9 pages.
Sheng Liu et al: "A Novel Prototype for an Optical See-Through Head-Mounted Display with Addressable Focus Cues", IEEE Transactions on Visualization and Computer Graphics, IEEE Service Center, Los Alamitos, CA, US, vol. 16, No. 3, May 1, 2010, pp. 381-393, XP011344617.
Rolland J P et al: "Dynamic Focusing in Head-Mounted Displays", Proceedings of SPIE, SPIE—International Society for Optical Engineering, US, vol. 3639, Jan. 25, 1999, pp. 463-470, XP008022044.
Andrew K. Kirby et al: "Adaptive lenses based on polarization modulation", Proceedings of SPIE, vol. 6018, Dec. 9, 2005, pp. 601814-1 to 601814-5, XP055101928.
Anonymous: "Lens (optics)—From Wikipedia, the free encyclopedia" Oct. 18, 2010, pp. 1-6, XP055102319, Retrieved from the Internet: URL:http://en.wikipedia.org/w/index.php?title=Lens_(optics)&oldid=391538808 [retrieved on Feb. 14, 2014].
First Office Action dated Nov. 21, 2013 in U.S. Appl. No. 12/949,650, 40 pages.
Response to Office Action filed May 21, 2014 in U.S. Appl. No. 12/949,650, 9 pages.
Final Office Action dated Jul. 14, 2014 in U.S. Appl. No. 12/949,650, 19 pages.
Supplementary European Search Report dated Jul. 19, 2013 in European Patent Application No. 11842082.7, 3 pages.
Communication pursuant to Article 94(3) EPC dated Sep. 12, 2013 in European Patent Application No. 11842082.7, 6 pages.
Response to Office Action filed Jan. 15, 2014 in European Patent Application No. 11842082.7, with Set of Claims and Description pages, 21 pages.
First Office Action dated Sep. 18, 2013 in Chinese Patent Application No. 201110386149.4, with English Summary of Office Action, 13 pages.
Response to Office Action filed Jan. 16, 2014 in Chinese Patent Application No. 201110386149.4, with Summary of the Response and English Translation of the Pending Claims, 9 pages.
Second Office Action dated Apr. 17, 2014 in Chinese Patent Application No. 201110386149.4, with English Summary of the Office Action, 7 pages.
Response to Office Action filed Jun. 19, 2014 in Chinese Patent Application No. 201110386149.4, with Summary of the Response and English Translation of the Pending Claims, 13 pages.
Office Action dated Oct. 10, 2013 in U.S. Appl. No. 13/221,770, 41 pages.
Response to Office Action filed Jan. 10, 2014 in U.S. Appl. No. 13/221,770, 12 pages.
Final Office Action dated Apr. 18, 2014 in U.S. Appl. No. 13/221,770, 22 pages.
English Abstract of CN101268388 published Sep. 17, 2008, 1 page.
English Abstract of CN101634750 published Jan. 27, 2010, 1 page.
Office Action dated Sep. 2, 2014 in Chinese Patent Application No. 201110364954.7 with English summary, 7 pages.
Response to Office Action filed Sep. 19, 2014 in U.S. Appl. No. 13/221,770, 17 pages.
Office Action with English translation dated Aug. 18, 2015 in Japanese Patent Application No. 2013-538778, 11 pages.
Office Action with English translation dated Sep. 28, 2015 in Japanese Patent Application No. 2013-539871, 9 pages.
Response to Office Action dated Sep. 30, 2015 in U.S. Appl. No. 13/221,770, 20 pages.
Response to Office Action dated Jul. 8, 2015 in U.S. Appl. No. 12/949,650, 10 pages.
Notice of Allowance dated Sep. 28, 2014 in Chinese Patent Application No. 201110386149.4, with partial English language translation and English Translation of the Allowed Claims, 8 pages.
Response to Office Action filed Dec. 15, 2014 in U.S. Appl. No. 12/949,650, 11 pages.
Notice of Allowance dated Jan. 7, 2015 in U.S. Appl. No. 12/949,650, 8 pages.
Office Action dated Jan. 26, 2015 in U.S. Appl. No. 13/221,770, 35 pages.
Response to Office Action filed Nov. 17, 2014 in Chinese Patent Application No. 201110364954.7, with partial English language translation and English Translation of the amended claims, 13 pages.
Office Action dated Apr. 9, 2015 in U.S. Appl. No. 12/949,650, filed Nov. 18, 2010, 27 pages.
Office Action with English translation dated Apr. 13, 2015 in Israel Patent Application No. 225874, 3 pages.
Notice of Allowance with English translation dated Jan. 27, 2015 in Chinese Patent Application No. 201110364954.7, 10 pages.
Office Action with English translation dated Apr. 13, 2015 in Israel Patent Application No. 225995, 3 pages.
Office Action with English translation of search report dated Apr. 10, 2015 in Taiwan Patent Application No. 100134409, 12 pages.
Response to Office Action dated Apr. 16, 2014 in U.S. Appl. No. 13/221,770, 17 pages.
Response to Office Action with English translation of amendments dated Jul. 13, 2015 in Taiwan Patent Applicatiion No. 100134409, 82 pages.
Office Action dated Jul. 24, 2015 in U.S. Appl. No. 13/221,770, 35 pages.
Notice of Allowance dated Dec. 3, 2015 in U.S. Appl. No. 12/949,650, 36 pages.
Notice of Allowance dated Nov. 6, 2015 in U.S. Appl. No. 13/221,770, 12 pages.
Response to Office Action with English translation of amended claims dated Jan. 19, 2016 in Japanese Patent Application No. 2013-539871, 7 pages.
Response to Office Action with English translation of amended claims dated Nov. 16, 2015 in Japanese Patent Application No. 2013-538778, 12 pages.

* cited by examiner

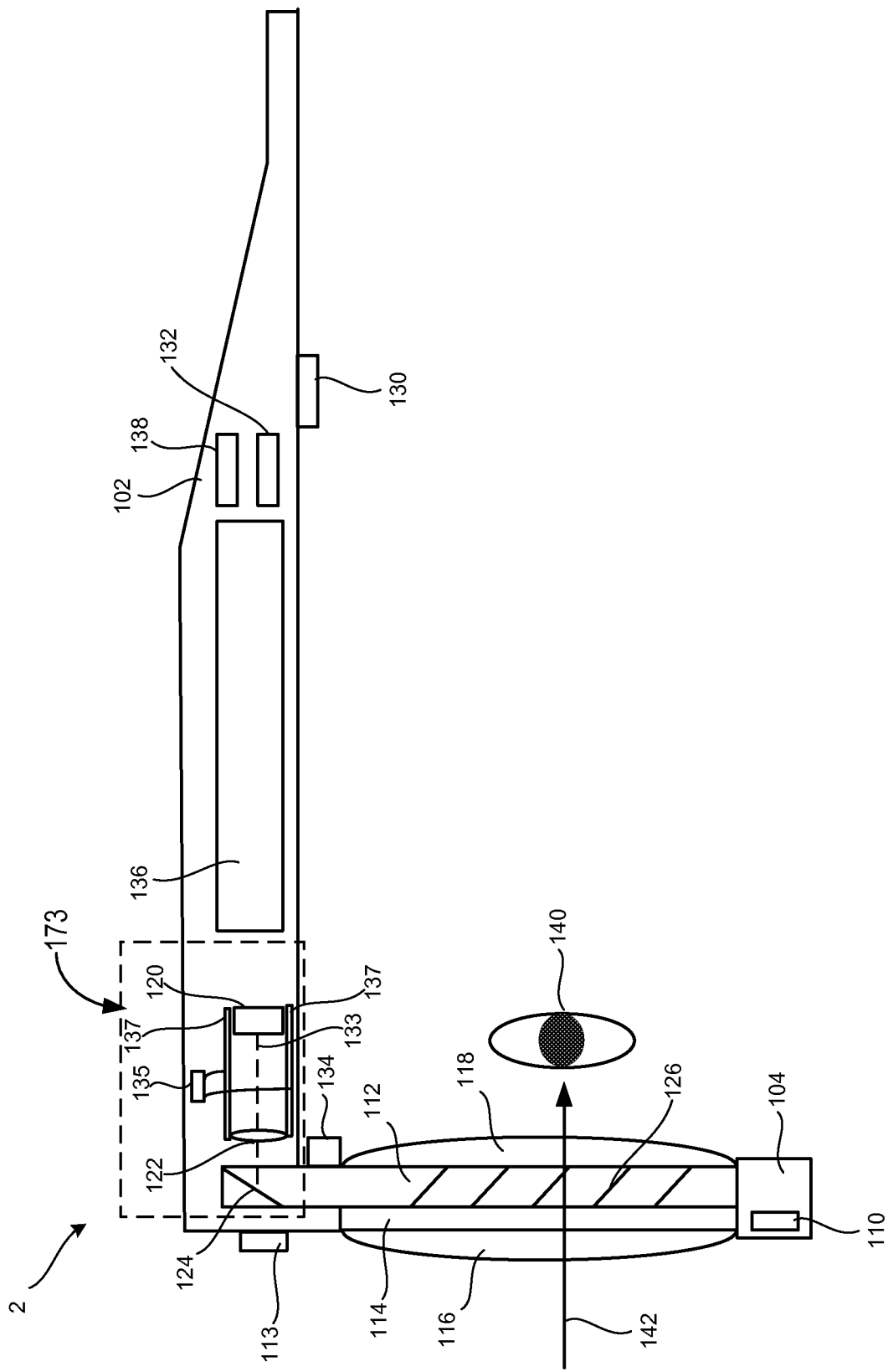

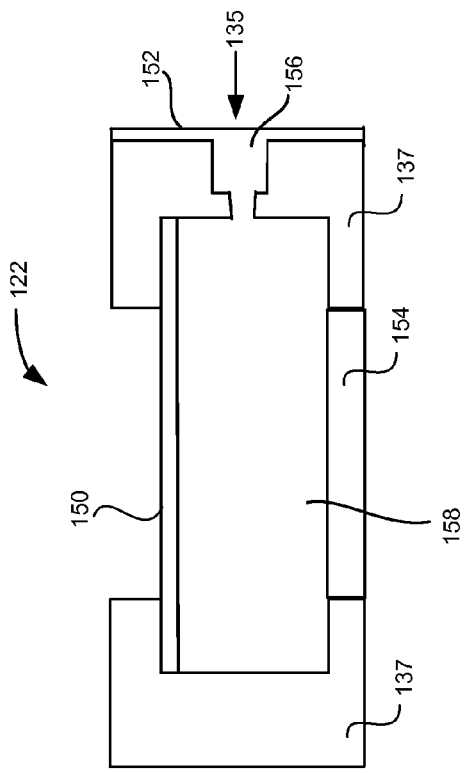
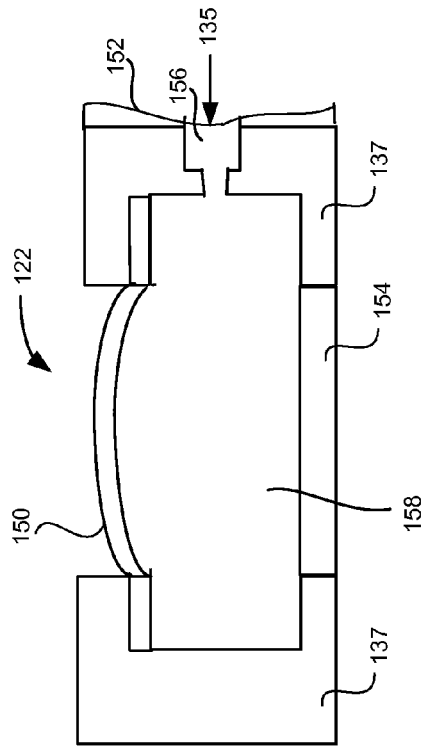
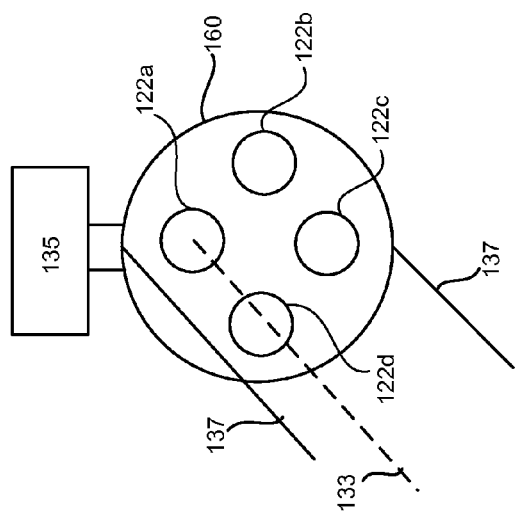
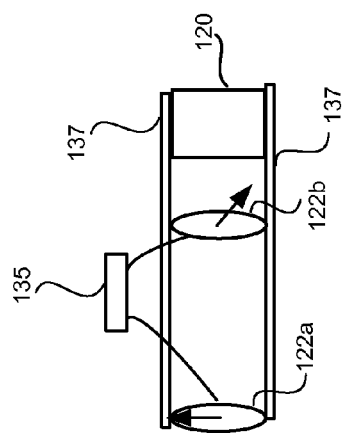
FIG. 3B1
FIG. 3B2
FIG. 3A
FIG. 3C

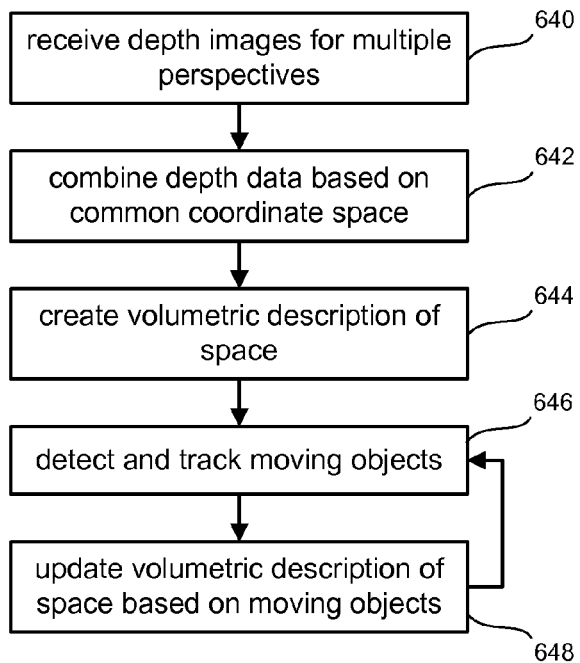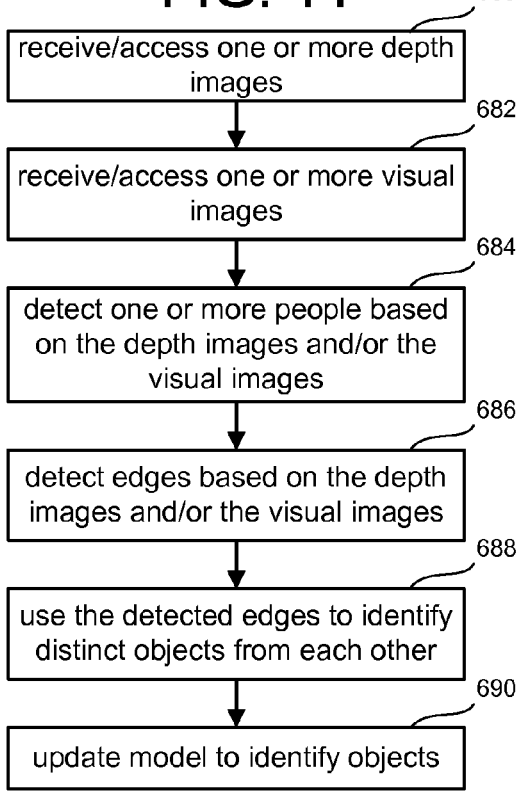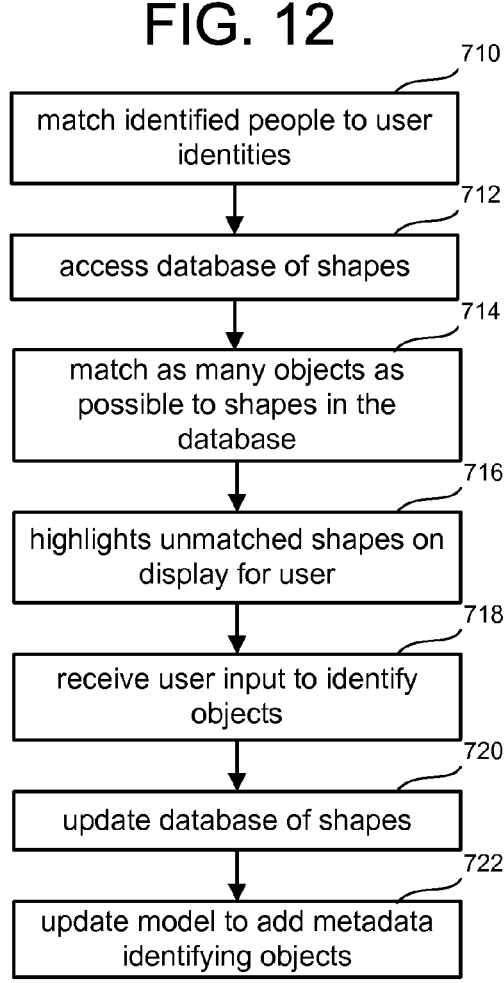

990 select a displacement value, S1, between a front nodal point of a lens system and the target location of the virtual object based on the equation 1/S1 + 1/S2 = 1/f, the lens system including at lease one fluid lens and being located in an optical path between a microdisplay and a reflecting element

992 apply at least one drive signal to cause the variable focus adjuster to cause a volume change in the fluid of the fluid lens causing a change in its radius of curvature to change its focal length, f, to generate the selected S1 value

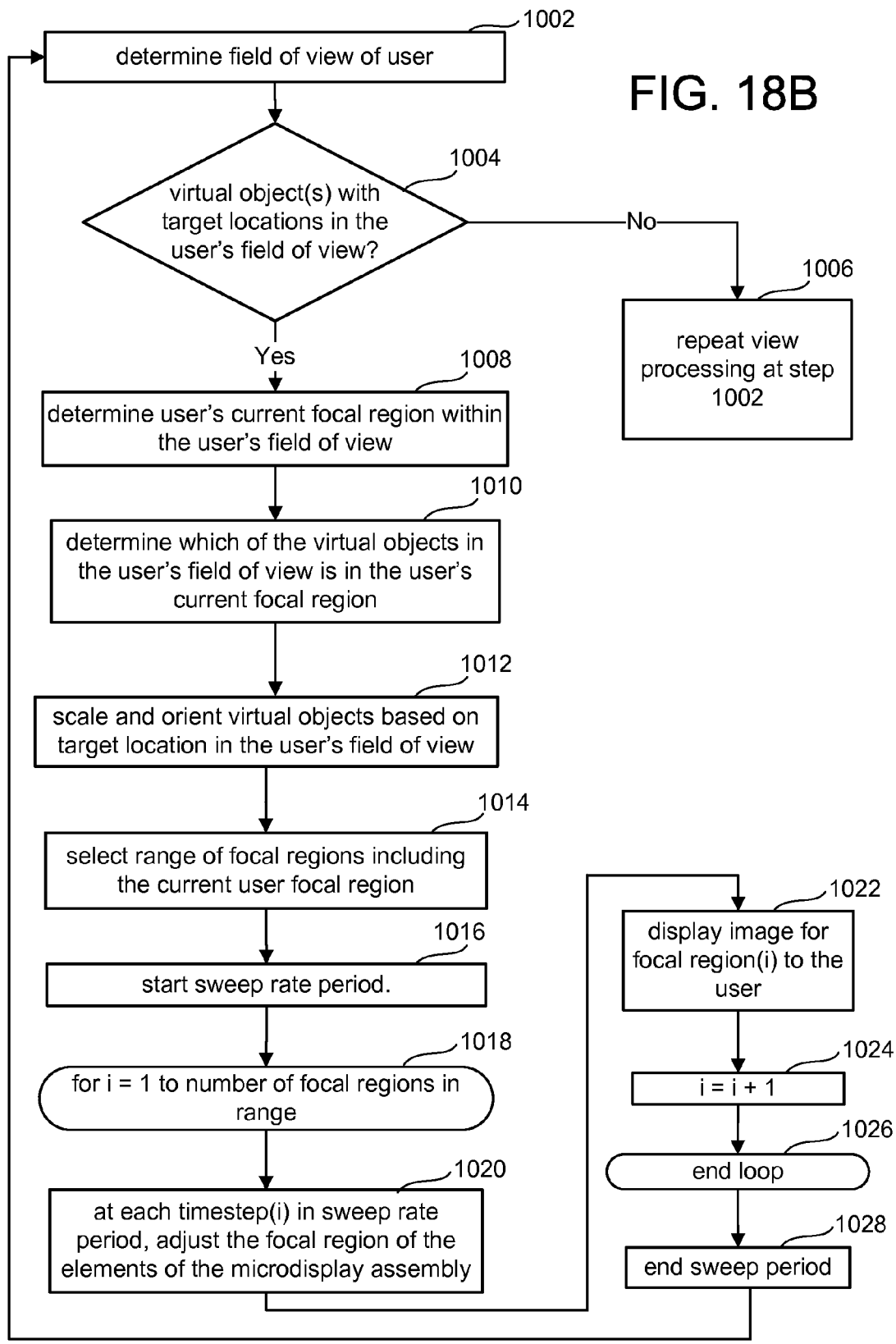

AUTOMATIC VARIABLE VIRTUAL FOCUS FOR AUGMENTED REALITY DISPLAYS

BACKGROUND

Augmented reality is a technology that allows virtual imagery to be mixed with a real world physical environment. Typically, see through near eye displays are worn by users to view the mixed imagery of virtual and real objects. The near-eye displays typically use a combination of optics and stereopsis to focus virtual imagery at a fixed distance. However, with the virtual object at a fixed distance, and the location of the user changing, the virtual object does not move in and out of focus to a user as it would if the user saw the virtual object with natural sight.

SUMMARY

The technology provides embodiments for achieving variable focus for mixed reality or augmented reality displays. A user views a scene through a see-through display device. The scene includes one or more real objects in a physical environment the user views directly with his or her eyes through clear or see-through lenses of the display device. One or more virtual objects are projected by the display device into at least one of the user's eye locations. Thus the display of the real scene is augmented with virtual objects.

In one embodiment, the technology provides for varying the focal distance of virtual objects projected by the display device. A three dimensional field of view is determined for the user, and the three dimensional locations of one or more virtual objects within the field of view of the user are determined as well. A current three dimensional focal region of the user is determined within the field of view. One or more virtual objects in the current focal region of the user are identified based on their locations.

To display a virtual object in the user's current focal region in the display, the virtual object is moved to a region of the image in the current focal region. In one embodiment, this is done by changing the focal region of a microdisplay assembly of the see-through display device. A microdisplay assembly may include elements such as a reflecting element, at least one optical element, and a microdisplay unit aligned along an optical path, as well as a variable virtual focus adjuster. The microdisplay unit generates images for display, and the light of the images travels along the optical path through at least one optical element, for example a collimating lens, to the reflecting element.

In one embodiment, the adjuster changes the displacement along the optical path between at least two elements of the microdisplay assembly to change the focal region of a virtual object in an image. In another embodiment, a focal length of an optical element may be adjusted to obtain the desired focal region. For example, polarization of at least one birefringent lens may be changed or a radius of curvature of a fluid or liquid lens may be adjusted.

In one embodiment, an artificial depth of field technique may be applied to a virtual object outside the user focal region but inside the user field of view as a function of distance from the user focal region.

The technology also provides an augmented reality system for providing variable focus of virtual objects comprising a see-through display unit comprising a microdisplay assembly that includes a variable virtual focus adjuster. Control circuitry includes a driver to control the variable virtual focus adjuster. In one embodiment, the system further includes a timing generator in the control circuitry to control the timing of the variable virtual focus adjuster sweeping the microdisplay assembly through different focal regions. In most embodiments, the rate of sweep is set to be rapid enough so that human temporal image fusion will make the images generated in the different focal regions appear to be present at once. A user viewing a display of the images generated in the different focal regions will see the virtual objects naturally in and out of focus as if the virtual objects were real objects in the physical environment.

The technology also provides a method for generating virtual objects in different focal regions in an augmented reality display. A three dimensional field of view is determined for a user viewing a scene including real and virtual objects using a see-through display device. A three dimensional focal region is identified for one or more virtual objects within the field of view of the user. The microdisplay assembly is adjusted to sweep through a number of focal regions. The focal regions may be selected to include a focal region the user is currently viewing and those regions including a virtual object. An image is generated for each focal region.

In one example, each of these images may be displayed to the user at a rate rapid enough so human temporal image fusion makes the images appear to be present at once to human eyes. In another example, a composite image of the in-focus portions of the virtual images generated at the different focal regions is displayed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2A is a top view of a portion of one embodiment of a head mounted display unit.

FIG. 3A is an example of a rotatable lens system for use as part of a microdisplay assembly of a near-eye display.

FIG. 3B1 and FIG. 3B2 are examples of a fluid lens exhibiting different radii of curvature, the fluid lens being for use as part of a microdisplay assembly.

FIG. 3C is an example of a birefringent lens system for use as part of a microdisplay assembly of a near-eye display.

FIG. 10 is a flow chart describing one embodiment of a process for creating a model of a space.

FIG. 11 is a flow chart describing one embodiment of a process for segmenting a model into objects.

FIG. 12 is a flow chart describing one embodiment of a process for identifying objects.

FIG. 17C is a flowchart describing one embodiment of a process for changing a focal region of a microdisplay assembly by changing a radius of curvature of at least one fluid lens of the assembly.

FIG. 18B is a flow chart describing another embodiment of a process for generating virtual object images in different focal regions in an augmented reality display.

DETAILED DESCRIPTION

Figure 1:
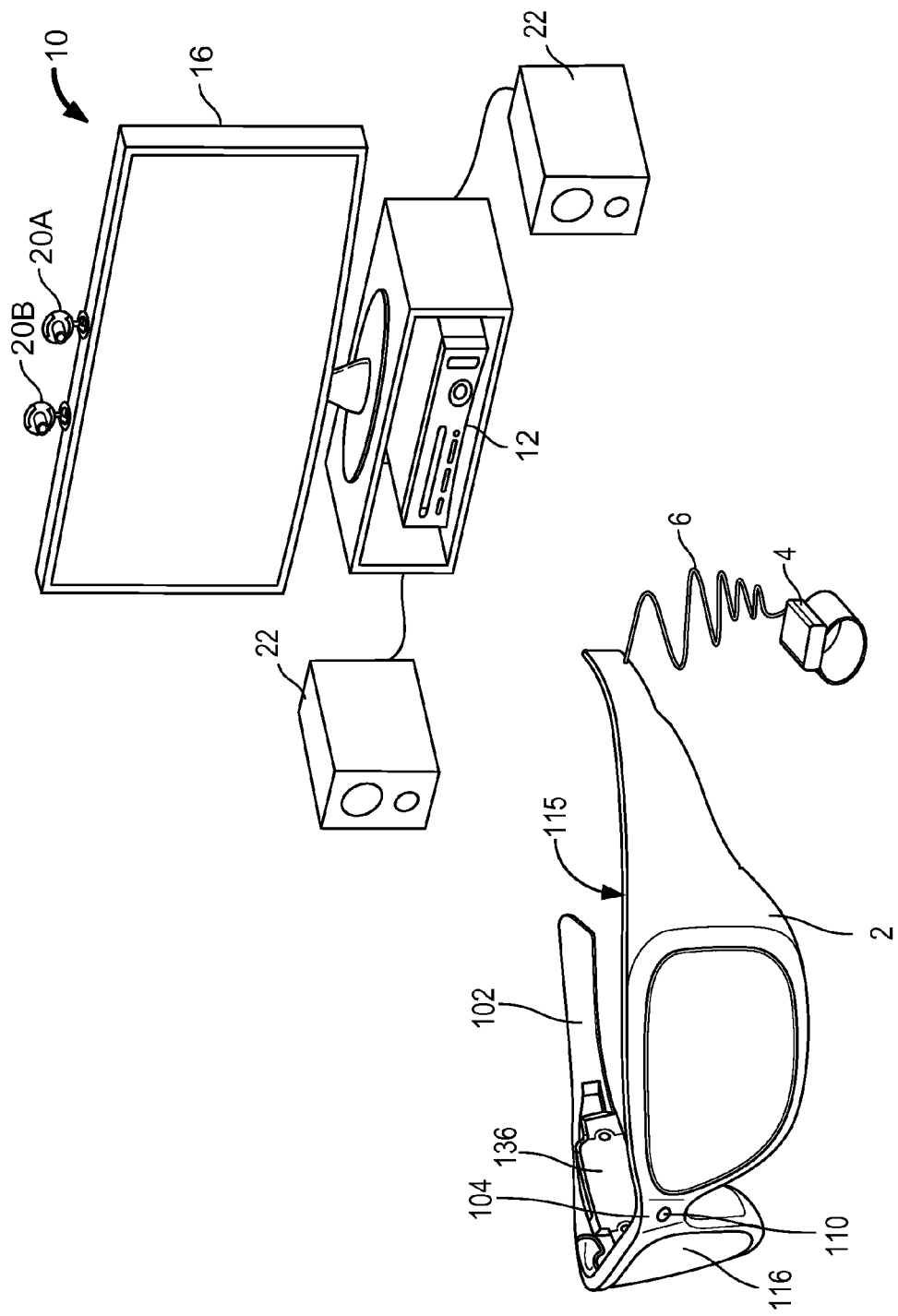
FIG. 1 is a block diagram depicting example components of one embodiment of the system for providing variable focus of virtual objects.

The technology provides embodiments for achieving variable focus for mixed reality or augmented reality displays. In one embodiment, a system includes as a near-eye display for augmented reality a see-through display device and a processing unit in communication with the see-through display device. In the embodiments discussed below, the see-through display is in a set of eyeglasses but other HMD formats and near-eye display holders can be used as well.

A user's natural sight is used to actually and directly view real objects in a scene viewed with the see-through display. Based on the context of executing software, for example, a gaming application, the system can project virtual images on the display that are viewable by the person wearing the see-through display device while that person is also viewing real world objects through the display.

One or more sensors are used to scan the physical environment the user views thus providing data upon which a three-dimensional model of the scanned environment can be built. The model is segmented into real objects, and as explained below, is augmented with the locations of virtual object images.

Additionally, various sensors are used to detect position and orientation of the user's head and eye position in order to determine where to project the virtual images. The system automatically tracks where the user is looking so that the system can figure out the user's field of view through the display of the see-through display device. The user can be tracked using depth cameras and any of various sensors including depth sensors, image sensors, inertial sensors, eye position sensors, etc. Besides the user's field of view, the system also determines at what location in the field of view the user is focused or is looking at, referred to often as the user focal region.

In some embodiments, the user focal region is a volume known as the Panum's fusional area, in which the human eyes see objects with single vision. Humans have binocular vision or stereoptic vision. Each eye produces an image from a different point of view. Only in this small volume of the Panum's fusional area do humans see an object with single vision. This is generally what is meant when an object is said to be in focus. Outside this area, objects can appear blurry or even appear as double images. Within the center of the Panum's fusional area is a Horopter which includes the focal point of the user's eyes. When a user is focused on a point in space, hereafter the focal point, that focal point is located on a curved line. Objects on this curved line in space fall on the retinas of the eyes in the fovea. The curved line is sometimes referred to as the horizontal horopter. There is also a vertical horopter which is a line through the curved line which tilts away from the eyes above the focal point and towards the eyes below the focal point on the curve. The term Horopter as used hereafter refers to both of its vertical and horizontal components.

Once the system knows the user's field of view, and the user focal region, the system can figure out where one or more virtual object images are to be projected by the display of the see-through display device. Generating a display of a virtual object at a selected focal region location in the projected display may be performed by adjusting an optical path length in the microdisplay assembly of the see-through display device.

Parallax is generated by shifting the images placed on left and right microdisplays. By setting an amount of parallax for a virtual object, its virtual distance is implied by the distance at which line of sight to the virtual object generated by the left eye display intersects the corresponding line of sight for the right eye display. Conventional displays can set this parallax implied distance. Independent of parallax there is a distance implied by curvature of the wave front that exits the display. The radius of curvature is simply the distance to a point on the object. Nearby objects have strongly curved wavefronts because the radius of curvature is thereby small. Distant objects have much flatter wavefronts because the radius of curvature is correspondingly large. In the limit of very distant objects the wavefront becomes planar. Conventional head mounted displays have a fixed wavefront curvature because they do not have optical elements that can be varied based on scene content.

In the case where the user's location changes to a location further from the current location of the virtual object, the parallax and scale for the virtual object can be changed by placing the appropriate images on the left and right microdisplays. An Horopter, and Panum's fusional area for the new location of the user can be defined. Conventional displays cannot adjust the wavefront radius of curvature to bring the virtual object into the Panum's fusional area. The technology described below can set the wavefront curvature to a distance, which also agrees with other cues set by scale and parallax, and which brings the virtual object into the Panum's fusional area. In this way the images appear natural and realistic. The same argument applies if the user remains fixed in location, and the virtual object is to move closer or farther away relative to natural objects in the scene.

A microdisplay assembly comprises light processing elements and a variable focus adjuster. Some examples of light processing elements are a microdisplay unit, one or more optical elements, for example lenses of a lens system and a reflecting element, for example a reflecting surface or a partially reflecting surface. The microdisplay unit includes a light source and generates an image of a virtual object. The microdisplay unit is optically aligned with the one or more optical elements and the reflecting element. The optical alignment may be along an optical axis or an optical path including one or more optical axes. The image light may be collimated and directed by the one or more optical elements to the reflecting element. The reflected light from a partially reflecting element may be directed to a user's eye locations in one embodiment. Since the surface is partially reflecting, it can also allow light from the natural scene to pass through it and be seen. In other embodiments the light from the microdisplay unit reflected by the reflecting element travels into another optical element which projects images for viewing by the user, and also allows natural light to be seen. The variable focus adjuster changes the displacement between one or more light processing elements in the optical path of the microdisplay assembly or an optical power of an element in the microdisplay assembly. The optical power of a lens is defined as the reciprocal of its focal length, e.g. 1/focal length so a change in one effects the other. The change results in a change in the region of the field of view which is in focus for an image generated by the microdisplay assembly with the changed displacement or optical power. As discussed for the embodiments below, there can be a microdisplay assembly for each eye. Each of the microdisplay assemblies performs the processing for the perspective of its respective eye.

In one example, an artificial depth of field technique such as artificial blur is applied to any virtual object in the field of view and outside the focal region in proportion to its distance from the focal region. In another embodiment, the adjuster sweeps through a range of focal lengths corresponding to a range of focal regions at a rate or frequency while displaying virtual objects within the respective focal regions. The rate or frequency may be equal to or faster than a frame rate for the display device. In one embodiment, the virtual object images generated at the different focal regions are displayed as layered images, and the rate of display is fast or rapid enough so that the images appear present at the same time. In another embodiment, a composite image of the in-focus portions of the images generated at the different focal regions is displayed. As a user changes his or her current focus to another focal region, the virtual objects in the different focal regions come in and out of focus as when viewed in natural sight.

The images are then rendered by sizing and orienting the virtual image and rendering that sized/oriented image on the see-through display.

FIG. 1 is a block diagram depicting example components of one embodiment of a system 10 for providing variable focus of virtual objects. System 10 includes a see-through display device as a head mounted display device 2 in communication with processing unit 4 via wire 6. In other embodiments, head mounted display device 2 communicates with processing unit 4 via wireless communication. Head mounted display device 2, which in one embodiment is in the shape of glasses in which frame 115 provides a support for holding elements of the system in place and as well as a conduit for electrical connections, is worn on the head of a user so that the user can see through a display and thereby have an actual direct view of the space in front of the user. The use of the term "actual and direct view" refers to the ability to see the real world objects directly with the human eye, rather than seeing created image representations of the objects. For example, looking through glass at a room allows a user to have an actual direct view of the room, while viewing a video of a room on a television is not an actual direct view of the room. More details of the head mounted display device 2 are provided below.

In one embodiment, processing unit 4 is worn on the user's wrist and includes much of the computing power used to operate head mounted display device 2. Processing unit 4 communicates wirelessly (e.g., WiFi, Bluetooth, infra-red, or other wireless communication means) to one or more hub computing systems 12.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. In one embodiment, hub computing system 12 may include a processor such as a standardized processor, a specialized processor, a microprocessor, or the like that may execute instructions stored on a processor readable storage device for performing the processes described herein.

Hub computing system 12 further includes one or more capture devices, such as capture devices 20A and 20B. In other embodiments, more or less than two capture devices can be used. In one example implementation, the capture devices 20A and 20B are pointed in different directions so that they capture different portions of the room. It may be advantageous that the field of view of the two capture devices slightly overlap so that hub computing system 12 can understand how the fields of view of the capture devices relate to each other. In this manner, multiple capture devices can be used to view an entire room (or other space). Alternatively, one capture device can be used if the capture device can be panned during operation so that over time the entire relevant space is viewed by the capture device.

Capture devices 20A and 20B may be, for example, cameras that visually monitor one or more users and the surrounding space such that gestures and/or movements performed by the one or more users, as well as the structure of the surrounding space, may be captured, analyzed, and tracked to perform one or more controls or actions within the application and/or animate an avatar or on-screen character.

Hub computing system 12 may be connected to an audiovisual device 16 such as a television, a monitor, a high-definition television (HDTV), or the like that may provide game or application visuals. For example, hub computing system 12 may include a video adapter such as a graphics card and/or an audio adapter such as a sound card that may provide audiovisual signals associated with the game application, non-game application, etc. The audiovisual device 16 may receive the audiovisual signals from hub computing system 12 and may then output the game or application visuals and/or audio associated with the audiovisual signals. According to one embodiment, the audiovisual device 16 may be connected to hub computing system 12 via, for example, an S-Video cable, a coaxial cable, an HDMI cable, a DVI cable, a VGA cable, component video cable, RCA cables, etc. In one example, audiovisual device 16 includes internal speakers. In other embodiments, audiovisual device 16, a separate stereo or hub computing system 12 is connected to external speakers 22.

Hub computing device 10, with capture devices 20A and 20B, may be used to recognize, analyze, and/or track human (and other types of) targets. For example, a user wearing head mounted display device 2 may be tracked using the capture devices 20A and 20B such that the gestures and/or movements of the user may be captured to animate an avatar or on-screen character and/or may be interpreted as controls that may be used to affect the application being executed by hub computing system 12.

FIG. 2A depicts a top view of a portion of head mounted display device 2, including a portion of the frame that includes temple 102 and nose bridge 104. Only the right side of head mounted display device 2 is depicted. Built into nose bridge 104 is a microphone 110 for recording sounds and transmitting that audio data to processing unit 4, as described below. At the front of head mounted display device 2 is physical environment facing video camera 113 that can capture video and still images. Those images are transmitted to processing unit 4, as described below.

A portion of the frame 115 of head mounted display device 2 will surround a display (that includes one or more optical elements). In order to show the components of head mounted display device 2, a portion of the frame 115 surrounding the display is not depicted. The display includes a light guide optical element 112, opacity filter 114, see-through lens 116 and see-through lens 118. In one embodiment, opacity filter 114 is behind and aligned with see-through lens 116, lightguide optical element 112 is behind and aligned with opacity filter 114, and see-through lens 118 is behind and aligned with lightguide optical element 112. See-through lenses 116 and 118 are standard lenses used in eye glasses and can be made to any prescription (including no prescription). In one embodiment, see-through lenses 116 and 118 can be replaced by a variable prescription lens. In some embodiments, head mounted display device 2 will include only one see-through lens or no see-through lenses. In another alternative, a prescription lens can go inside lightguide optical element 112. Opacity filter 114 filters out natural light (either on a per pixel basis or uniformly) to enhance the contrast of the virtual imagery. Lightguide optical element 112 channels artificial light to the eye. More details of opacity filter 114 and lightguide optical element 112 are provided below.

Mounted to or inside temple 102 is an image source, which in one or more embodiments includes microdisplay 120 which projects an image through one or more optical elements, for example a lens system 122, onto a reflecting element which in this embodiment is a reflecting surface 124 which guides the image into the lightguide optical element 112. There are different image generation technologies that can be used to implement microdisplay 120. For example, microdisplay 120 can be implemented using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the system described herein. Additionally, microdisplay 120 can be implemented using an emissive technology where light is generated by the display. For example, a PicoP™ engine from Microvision, Inc. emits a laser signal with a micro mirror steering either onto a tiny screen that acts as a transmissive element or beamed directly into the eye (e.g., laser).

In the illustrated embodiment, microdisplay 120 is part of a microdisplay assembly 173 comprising light processing elements for transferring an image to a see-through display. The microdisplay assembly in this example comprises the microdisplay 120, one or more optical elements embodied in a lens system 122, and the reflecting surface 124. Lens system 122 may comprise a single lens or a plurality of lenses. The lens system 122, the microdisplay unit 120 and the reflecting surface 124 (e.g. a mirror or other surface) are aligned in an optical path, in this example aligned along optical axis 133. The image light may be collimated and directed by the lens system 122 to the reflecting surface 124.

The microdisplay assembly 173 further comprises a variable virtual focus adjuster 135 which controls a displacement between the lens system 122 and the microdisplay unit 120, or a displacement between the lens system 122 and the reflecting surface 124 or both along the optical path 133. Different displacements between the light processing elements of the microdisplay assembly correspond to different focal regions in the three-dimensional field of view of the user into which virtual objects may be projected. In this example, the displacement changes are guided within an armature 137 supporting at least one light processing element such as the lens system 122 and the microdisplay 120 in this example. The armature 137 helps stabilize the alignment along the optical path 133 during physical movement of the elements to achieve a selected displacement or a selected optical power. The displacement range is typically on the order of a few millimeters (mm). In one example, the range is 1-2 mm.

In one example, the adjuster 135 may be an actuator such as a piezoelectric motor. Other technologies for the actuator may also be used and some examples of such technologies are a voice coil formed of a coil and a permanent magnet, a magnetostriction element, and an electrostriction element.

Lightguide optical element 112 transmits light from microdisplay 120 to the eye 140 of the user wearing head mounted display device 2. Lightguide optical element 112 also allows light from in front of the head mounted display device 2 to be transmitted through lightguide optical element 112 to eye 140, as depicted by arrow 142, thereby allowing the user to have an actual direct view of the space in front of head mounted display device 2 in addition to receiving a virtual image from microdisplay 120. Thus, the walls of lightguide optical element 112 are see-through. Lightguide optical element 112 includes a first reflecting surface 124. Light from microdisplay 120 passes through lens system 122 and becomes incident on reflecting surface 124. The reflecting surface 124 reflects the incident light from the microdisplay 120 such that light is trapped inside a planer, substrate comprising lightguide optical element 112 by internal reflection. After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye 140 of the user. As different light rays will travel and bounce off the inside of the substrate at different angles, the different rays will hit the various reflecting surface 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a lightguide optical element can be found in United States Patent Application Publication 2008/0285140, Ser. No. 12/214,366, published on Nov. 20, 2008, "Substrate-Guided Optical Devices" incorporated herein by reference in its entirety. In one embodiment, each eye will have its own lightguide optical element 112. When the head mounted display device has two light guide optical elements, each eye can have its own micro display 120 that can display the same image in both eyes or different images in the two eyes. In another embodiment, there can be one lightguide optical element which reflects light into both eyes.

Opacity filter 114, which is aligned with lightguide optical element 112, selectively blocks natural light, either uniformly or on a per-pixel basis, from passing through lightguide optical element 112. In one embodiment, the opacity filter can be a see-through LCD panel, electrochromic film, or similar device which is capable of serving as an opacity filter. Such a see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

Opacity filter 114 can include a dense grid of pixels, where the light transmissivity of each pixel is individually controllable between minimum and maximum transmissivities. While a transmissivity range of 0-100% is ideal, more limited ranges are also acceptable. As an example, a monochrome LCD panel with no more than two polarizing filters is sufficient to provide an opacity range of about 50% to 90% per pixel, up to the resolution of the LCD. At the minimum of 50%, the lens will have a slightly tinted appearance, which is tolerable. 100% transmissivity represents a perfectly clear lens. An "alpha" scale can be defined from 0-100%, where 0% allows no light to pass and 100% allows all light to pass. The value of alpha can be set for each pixel by the opacity filter control circuit 224 described below.

More details of an opacity filter are provided in U.S. patent application Ser. No. 12/887,426, "Opacity Filter For See-Through Mounted Display," filed on Sep. 21, 2010, and U.S. patent application Ser. No. 12/905,952 filed Oct. 15, 2010 entitled "Fusing Virtual Content Into Real Content" having inventors Jason Flaks, Avi Bar-Zev, Jeffrey Margolis, Chris Miles, Alex Kipman, Andrew Fuller, and Bob Crocco, both applications being incorporated herein by reference in their entirety.

Head mounted display device 2 also includes a system for tracking the position of the user's eyes. As will be explained below, the system will track the user's position and orientation so that the system can determine the field of view of the user. However, a human will not perceive everything in front of them. Instead, a user's eyes will be directed at a subset of the environment. Therefore, in one embodiment, the system will include technology for tracking the position of the user's eyes in order to refine the measurement of the field of view of the user. For example, head mounted display device 2 includes eye tracking assembly 134 (see FIG. 2A), which will include an eye tracking illumination device 134A and eye tracking camera 134B (see FIG. 4). In one embodiment, eye tracking illumination source 134A includes one or more infrared (IR) emitters, which emit IR light toward the eye. Eye tracking camera 134B includes one or more cameras that sense the reflected IR light.

The position of the pupil can be identified by known imaging techniques which detect the reflection of the cornea. For example, see U.S. Pat. No. 7,401,920, entitled "Head Mounted Eye Tracking and Display System", issued Jul. 22, 2008 to Ophir et al., incorporated herein by reference. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eye usually moves in unison. However, it is possible to track each eye separately.

In one embodiment, the system will use four infrared (IR) LEDs and four IR photo detectors in rectangular arrangement so that there is one IR LED and IR photo detector at each corner of the lens of head mounted display device 2. Light from the LEDs reflect off the eyes. The amount of infrared light detected at each of the four IR photo detectors determines the pupil direction. That is, the amount of white versus black in the eye will determine the amount of light reflected off the eye for that particular photo detector. Thus, the photo detector will have a measure of the amount of white or black in the eye. From the four samples, the system can determine the direction of the eye.

Another alternative is to use four infrared LEDs as discussed above, but only one infrared imaging device on the side of the lens of head mounted display device 2. The imaging device will use a small mirror and/or lens (fish eye) such that the imaging device can image up to 75% of the visible eye from the glasses frame. The imaging device will then sense an image and use computer vision to find the image, much like as discussed above. Thus, although FIG. 2A shows one assembly with one IR emitter, the structure of FIG. 2A can be adjusted to have four IR transmitters and/or four IR sensors. More or less than four IR transmitters and/or four IR sensors can also be used.

Another embodiment for tracking the direction of the eyes is based on charge tracking. This concept is based on the observation that a retina carries a measurable positive charge and the cornea has a negative charge. Sensors are mounted by the user's ears (near earphones 130) to detect the electrical potential while the eyes move around and effectively read out what the eyes are doing in real time. Other embodiments for tracking eyes can also be used.

Control circuits 136 provides various electronics that support the other components of head mounted display device 2. More details of control circuits 136 are provided below with respect to FIG. 4. Inside, or mounted to temple 102, are ear phones 130, inertial sensors 132 and temperature sensor 138. In one embodiment inertial sensors 132 include a three axis magnetometer 132A, three axis gyro 132B and three axis accelerometer 132C (See FIG. 4). The inertial sensors are for sensing position, orientation, sudden accelerations of head mounted display device 2.

FIG. 2A only shows half of the head mounted display device 2. A full head mounted display device would include another set of see through lenses, another opacity filter, another lightguide optical element, another microdisplay 120, another lens system 122, room facing camera 113, eye tracking assembly 134, earphones 130, and temperature sensor 138.

Figure 2B:
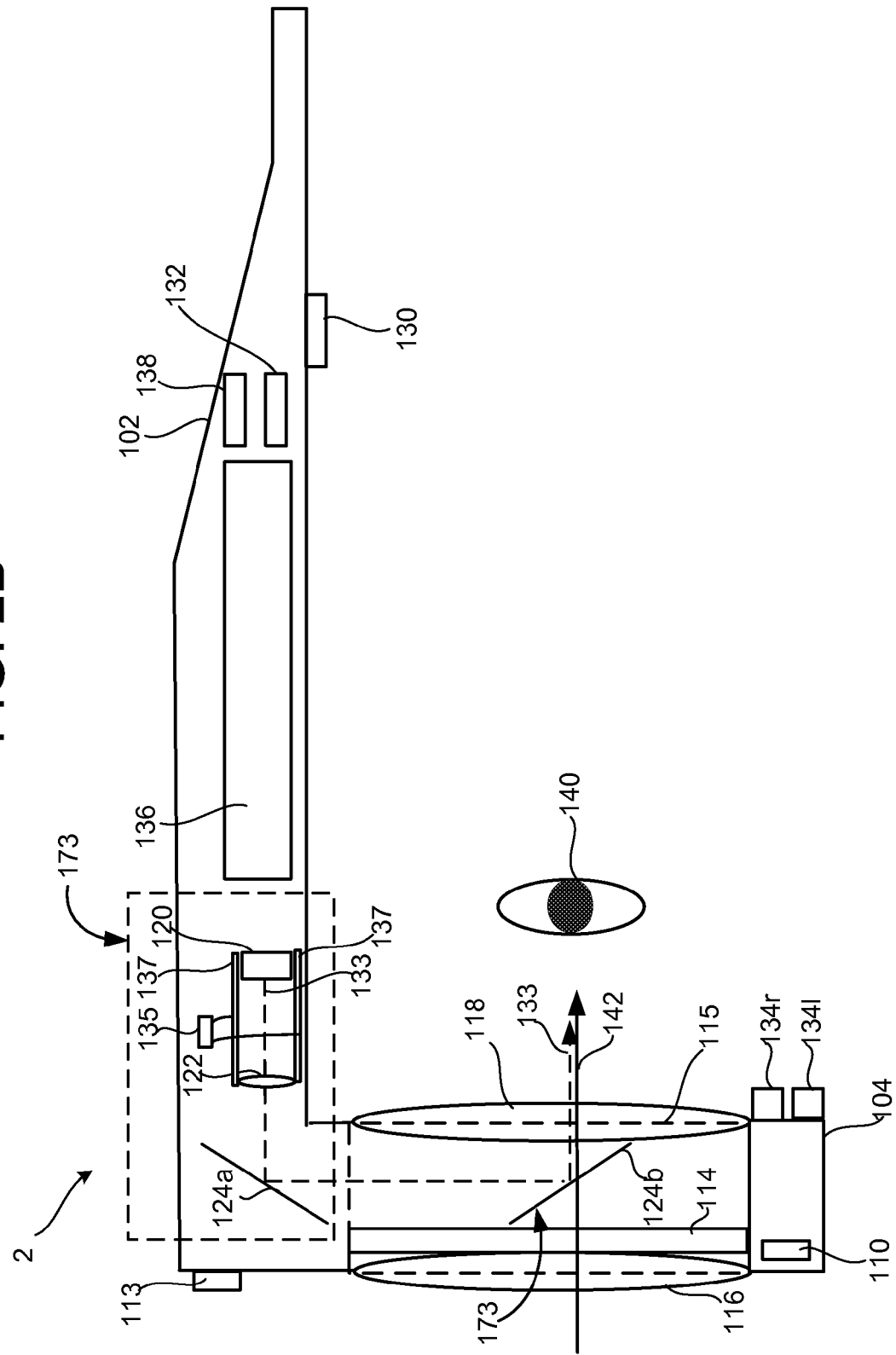
FIG. 2B is a top view of a portion of another embodiment of a head mounted display unit.

FIG. 2B is a top view of a portion of another embodiment of a head mounted display unit. Frame 115 is shown in dotted lines to expose the arrangement of optical elements supported therein. In this embodiment, light from a reflecting element 124a is directed to a partially reflective element 124b which combines the virtual image view traveling along optical path 133 with the natural or actual and direct view 142. The natural view 142 may be affected by the opacity filter 114. The combination of views are directed into a user's eye 140 rather than into another optical element such as lightguide optical element 112 In this embodiment, frame 115 provides a convenient eyeglass frame as support for the elements of the system such as the microdisplay assembly 173 including its light processing elements 122 and 120, the variable focus adjuster 135 and the armature 137. In this example, the eye tracking camera 134r, 134l for each eye is positioned on the bridge 104. In other embodiments, other support structures besides an eyeglasses frame can be used. An example of such a structure is a visor.

As mentioned above, the configuration of the light processing elements of the microdisplay assembly 173 create a focal distance or focal region in which a virtual object appears in an image. Changing the configuration changes the focal region for the virtual object image. The focal region determined by the light processing elements can be determined and changed based on the equation $1/S_1 + 1/S_2 = 1/f$. The symbol f represents the focal length of a lens such as lens system 122 in the microdisplay assembly 173. The lens system 122 has a front nodal point and a rear nodal point. If light rays are directed toward either nodal point at a given angle relative to the optical axis, the light rays will emerge from the other nodal point at an equivalent angle relative to the optical axis. In one example, the rear nodal point of lens system 122 would be between itself and the reflecting element 124 in FIG. 2A or the reflecting element 124a in FIG. 2B. The distance from the rear nodal point to the reflecting element 124, 124a may be denoted as $S_2$. The front nodal point would be between the lens system 122 and a target location of the virtual image generated by the microdisplay 120 in a three-dimensional model of the user's physical space. (See discussion of FIGS. 10-12 below for more details about creating the model.) The distance from the front nodal point to the target location of the virtual image may be denoted as $S_1$.

If the focal length of the lens is fixed, $S_1$ and $S_2$ are varied to focus virtual objects at different depths. For example, an initial position may have $S_1$ set to infinity, and $S_2$ equal to the focal length of lens system 122. Assuming lens system 122 has a focal length of 10 mm, consider an example in which the virtual object is to be placed about 1 foot or 30 cm into the user's field of view. $S_1$ is now about 30 cm or 300 mm, f is 10 mm and $S_2$ is set currently at the initial position of the focal length, 10 mm, meaning the rear nodal point of lens system 122 is 10 mm from the reflecting element 124, 124a. The new distance or new displacement between the lens 122 and reflecting element 124, 124a is determined based on $1/300 + 1/S_2 = 1/10$ with all in units of mm. The result is about 10.3 mm for $S_2$.

In one example, the processing unit 4 can calculate the displacement values for $S_1$ and $S_2$, leaving the focal length f fixed and cause the control circuitry 136 to cause the variable adjuster driver 237 to send drive signals to have the variable virtual focus adjuster 135 move the lens system 122 along the optical path 133 for example. In some examples, the adjuster 135 may move one or more optical elements 122 within the armature 137. In other examples, the armature may have grooves or space in the area around a light processing element so it slides over the element, for example, microdisplay 120, without moving the light processing element. Another element in the armature such as the one or more optical elements 122 are attached so that they slide or move with the moving armature 237. In other embodiments, the microdisplay unit 120 or the reflecting element 124, 124a or both may be moved instead or in addition to moving the lens system 122.

In other embodiments, the focal length of at least one lens in the lens system 122 may be changed instead or with changes in the displacement along the optical path 133 as well. Some embodiments of microdisplay assemblies are illustrated in FIGS. 3A through 3D. The specific number of lenses shown are just examples. Other numbers and configurations of lenses operating on the same principles may be used.

FIG. 3A is an example of a rotatable lens system for use as part of a microdisplay assembly of a near-eye display. Each of the lenses 122a, 122b, 122c and 122d has a different focal length and are supported within a disk support 160 rotable by the variable virtual focus adjuster 135. The processing unit 4 determines a focal region and selects one of the focal length lenses to obtain that focal region. As shown with respect of FIG. 3, a variable adjuster driver 237 of the control circuitry 136 sends at least one control signal to the variable virtual focus adjuster 135 to rotate the disk so the selected lens is aligned in the optical path 133 of the assembly.

FIG. 3B1 and FIG. 3B2 are examples of a fluid lens exhibiting different radii of curvature as shown in Hongwen et al., Tunable-focus liquid lens controlled using a servo motor, OPTICS EXPRESS, 4 Sep. 2006, Vol. 14, No. 18, pp. 8031-8036. The fluid lens can be used as part of a microdisplay assembly. The focal length of the lens may be changed by changing the radius of curvature. The relationship between radius of curvature, R, and a focal length, f, is given by $f = R/n_{liquid} - 1$. The refractive index of the liquid or fluid of the lens is $n_{liquid}$.

This embodiment comprises a support 137 such as an annular sealing ring having a flexible external membrane 152, in one example a rubber membrane, as a portion or connected to it. The external membrane 153 is in contact with a reservoir of liquid 156. A lens membrane 150 rests on top of or forms a flexible side of a liquid lens cell 158 which can receive from and release liquid into the reservoir 156. In the cited example, the flexible lens membrane is an elastic membrane such as polydimethylsiloxane (PDMS) elastomeric membrane. Glass plate 154 behind the liquid cell provides support. The variable virtual focus adjuster 135 is controlled to push against the flexible external membrane 152 as shown in FIG. 3B2 and release the membrane 152 as in FIG. 3B1 to cause the volume of water in the reservoir 156 to go into and out of the liquid lens 158, thus convexing the elastic membrane 150 and relaxing the elastic membrane 150 due to the volume of liquid changes. Changes in the volume of liquid cause changes in the radius of curvature of the lens membrane 150 and thus in the focal length of the liquid lens 158. They relationship between the radius of curvature and the change in volume $\Delta V$ may be expressed as follows:

$$\Delta V = (1/3)\pi(2R^2 - r_0^2 - 2R\sqrt{R^2 - r_0^2})(2R + \sqrt{R^2 - r_0^2})$$

where $r_0$ is the radius of the lens aperture.

FIG. 3C is an example of a birefringent lens system for use as part of a microdisplay assembly of a near-eye display. A birefringent material is anisotropic or directionally dependent. Describing light as a ray as an illustrative construct, a birefringent lens decomposes light into an ordinary ray and an extraordinary ray. For a single axis of anisotropy or optical axis, different refractive indices, and therefore different focal lengths, can exist for different polarizations, one parallel and one perpendicular to the axis. In the example of FIG. 3C, lenses 122a and 122b are lenses made of a birefringent material with different polarizations as indicated by the arrows. In this example of two lenses, four different refractive indices or focal lengths can be predetermined for selection. Each different focal length can be associated with a different focal region for selection by the processing unit 4. The polarization combinations can be perpendicular polarizations for lenses 122a and 122b as shown in FIG. 3C, the opposite perpendicular polarizations to those shown in FIG. 3C, the two lenses having the same polarizations in one direction, and the two lenses have the same polarizations in the other direction of polarization. The variable virtual focus adjuster may apply a voltage to each lens to effect a selected polarization in one embodiment. In another embodiment, a physical stress may be applied to change the polarization of a lens.

Figure 3D:
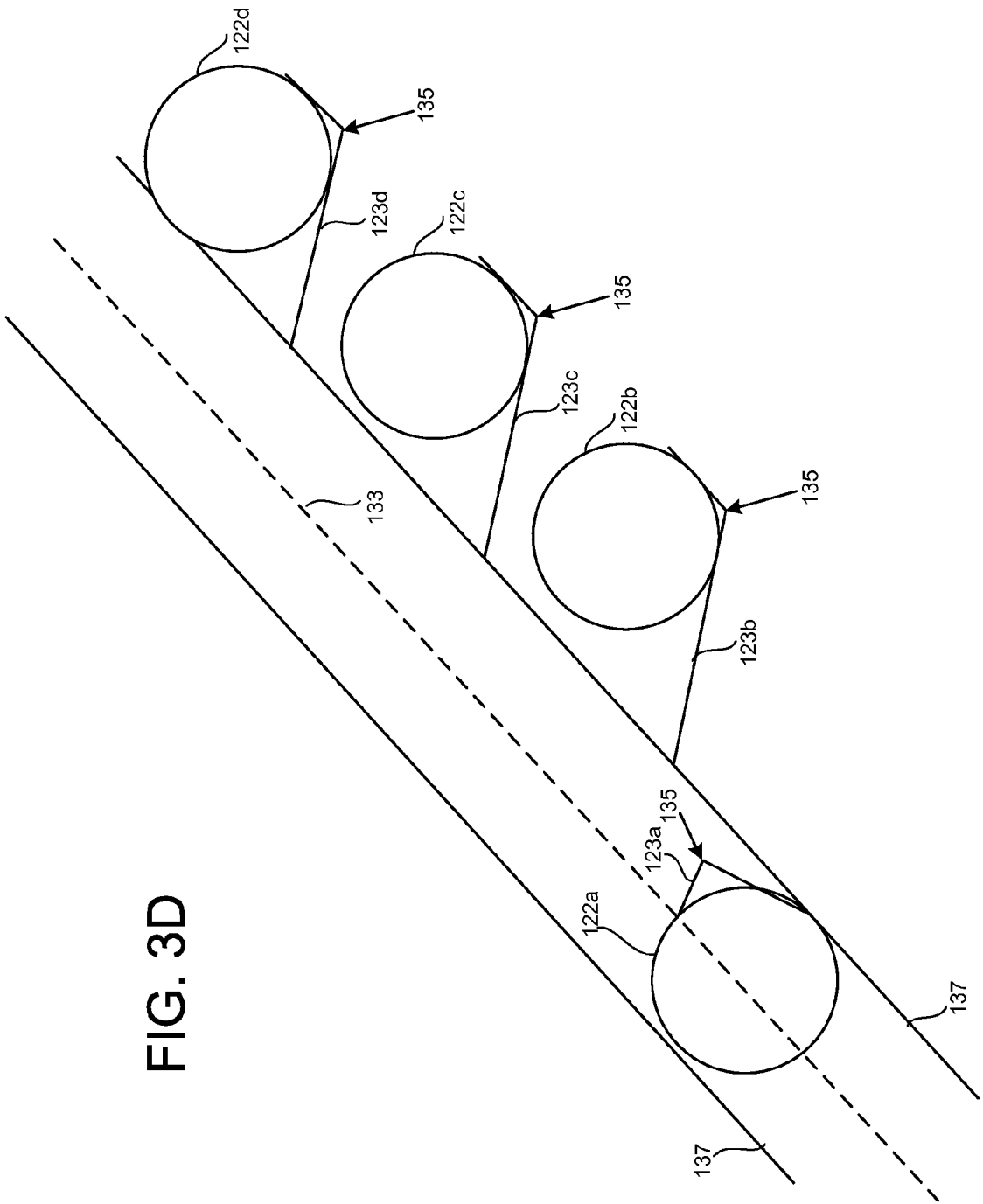
FIG. 3D is an example of an insertable lens system for use as part of a microdisplay assembly.

FIG. 3D is an example of an insertable lens system for use as part of a microdisplay assembly. In this embodiment, each of a number of lenses 122a, 122b, 122c and 122d is attached to a respective arm 123a, 123b, 123c and 123d attached to the armature 137. Each arm (e.g. 123a) moves its one or more optical elements, for example a lens or lens system f e.g. 122a), in position at a displacement in the optical path 133 of the microdisplay assembly under the control of the variable virtual focus adjuster 135. For example, if predetermined displacements for preset focal regions are being used, each of the lenses 122a, 122b, 122c and 122d can be set a certain distance apart from its one or more neighbors, for example 0.1 millimeters (mm) apart. Non-uniform spacing and adjustable displacements can also be used.

In each of the examples above adjusting the focal length of a lens, displacement along the optical path 133 may also be performed.

Again as mentioned above, each of the microdisplay assemblies performs the processing for the perspective of its respective eye so the virtual image appears in the user focal region, e.g. the Panum's fusional area, the area of single vision for humans.

Figure 4:
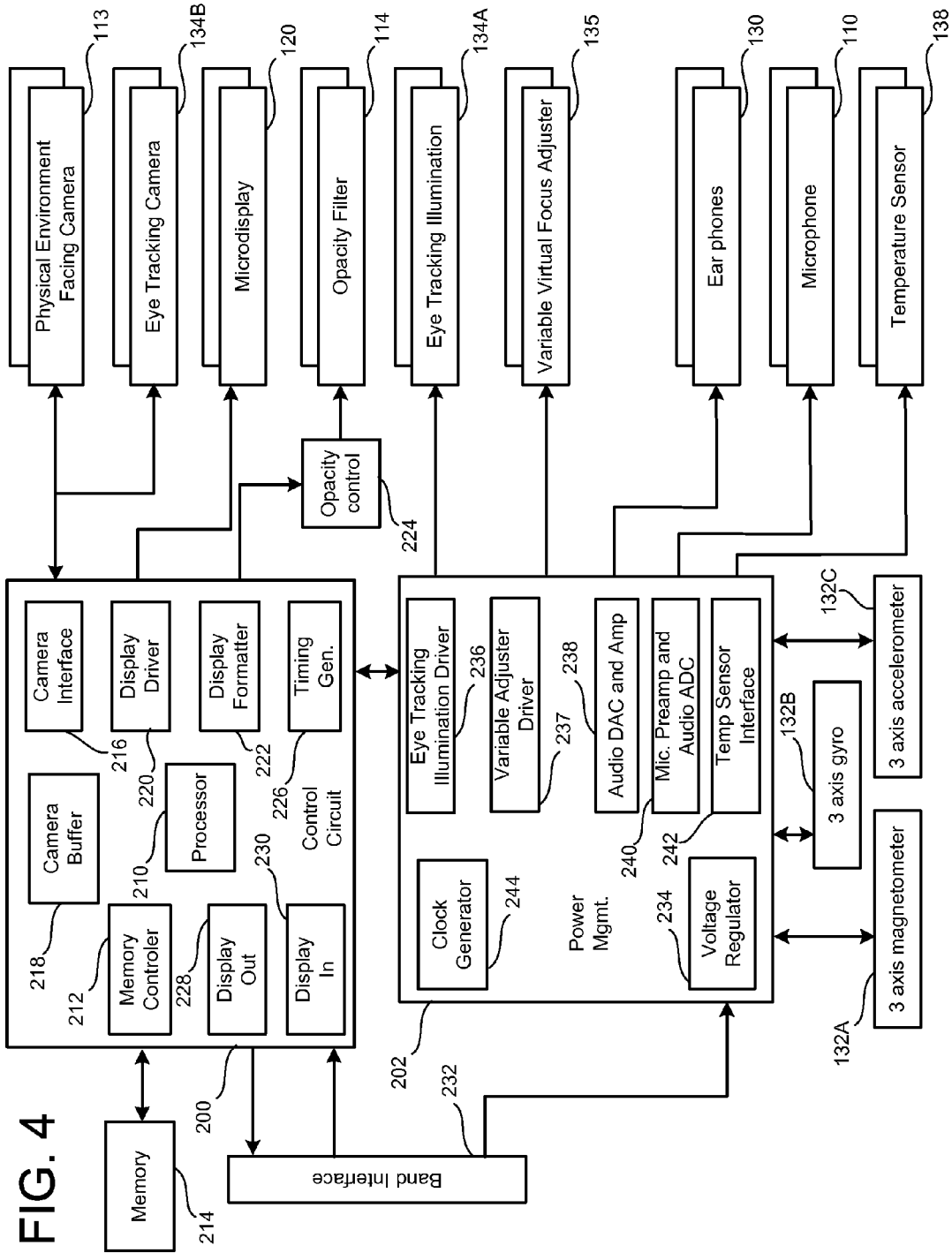
FIG. 4 is a block diagram of one embodiment of the components of a head mounted display unit.
Figure 5:
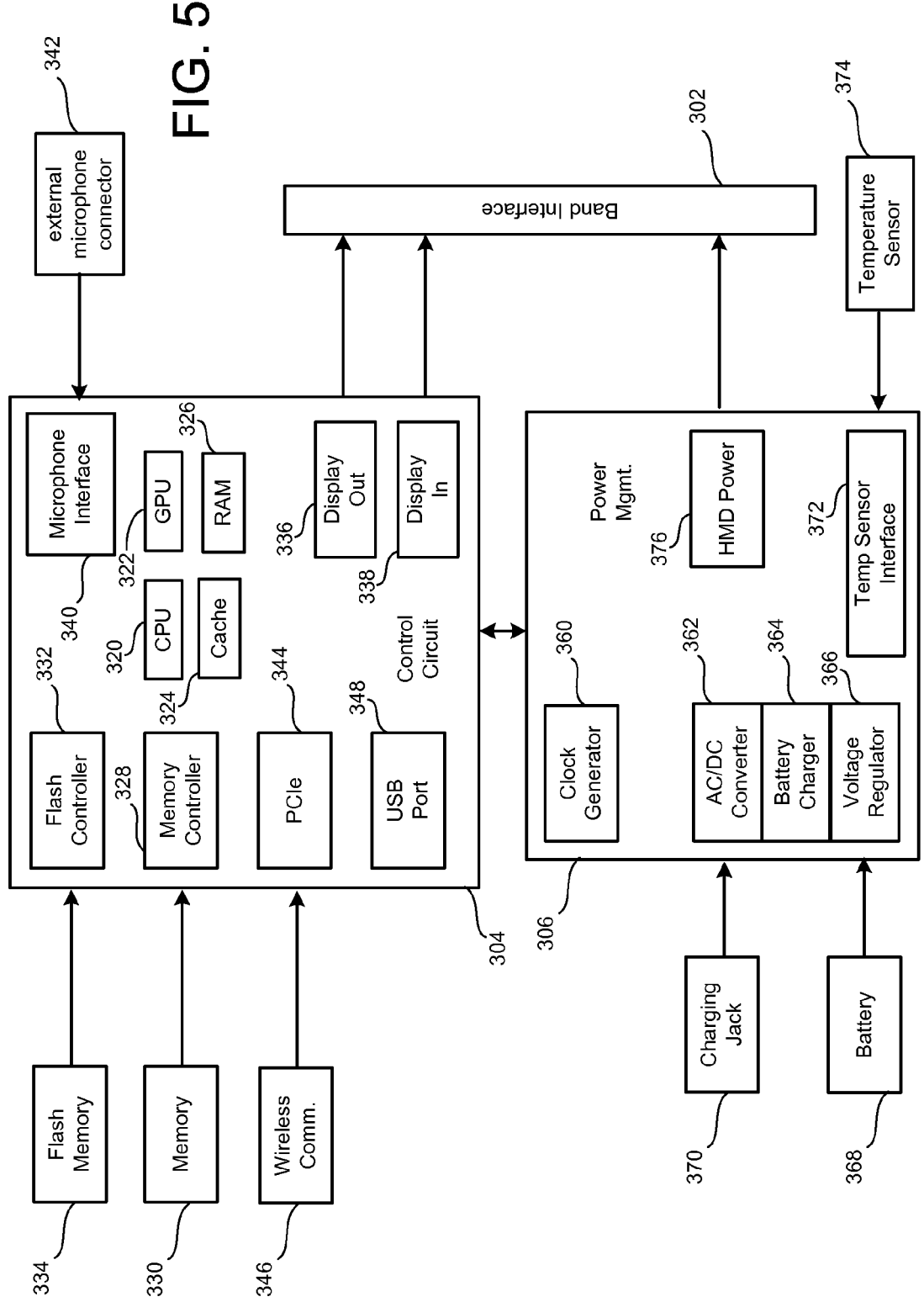
FIG. 5 is a block diagram of one embodiment of the components of a processing unit associated with a head mounted display unit.

FIG. 4 is a block diagram depicting the various components of head mounted display device 2. FIG. 5 is a block diagram describing the various components of processing unit 4. Head mounted display device 12, the components of which are depicted in FIG. 4, are used to provide a virtual image in-focus with the user's view of the real world. Additionally, the head mounted display device components of FIG. 4 include many sensors that track various conditions. Head mounted display device will receive instructions about the virtual image from processing unit 4 and will provide the sensor information back to processing unit 4. Processing unit 4, the components of which are depicted in FIG. 5, will receive the sensory information from head mounted display device 3 and also from hub computing device 12 (See FIG. 1). Based on that information, processing unit 4 will determine where and when to provide an in-focus virtual image to the user and send instructions accordingly to the head mounted display device of FIG. 4.

Note that some of the components of FIG. 4 (e.g., physical environment facing camera 113, eye tracking camera 134B, variable virtual focus adjuster 135, micro display 120, opacity filter 114, eye tracking illumination 134A, earphones 130, and temperature sensor 138) are shown in shadow to indicate that there are two of each of those devices, one for the left side and one for the right side of head mounted display device 2. FIG. 4 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230. In one embodiment, all of components of control circuit 220 are in communication with each other via dedicated lines or one or more buses. In another embodiment, each of the components of control circuit 200 are in communication with processor 210. Camera interface 216 provides an interface to the two physical environment facing cameras 113 and stores images received from the physical environment facing cameras in camera buffer 218. Display driver 220 will drive microdisplay 120. Display formatter 222 provides information, about the virtual image being displayed on microdisplay 120, to opacity control circuit 224, which controls opacity filter 114. Timing generator 226 is used to provide timing data for the system. Display out 228 is a buffer for providing images from physical environment facing cameras 113 to the processing unit 4. Display in 230 is a buffer for receiving images such as a virtual image to be displayed on microdisplay 120. Display out 228 and display in 230 communicate with band interface 232 which is an interface to processing unit 4.

Power management circuit 202 includes voltage regulator 234, eye tracking illumination driver 236, variable adjuster driver 237, audio DAC and amplifier 238, microphone preamplifier and audio ADC 240, temperature sensor interface 242 and clock generator 244. Voltage regulator 234 receives power from processing unit 4 via band interface 232 and provides that power to the other components of head mounted display device 2. Eye tracking illumination driver 236 provides the IR lightsource for eye tracking illumination 134A, as described above. The variable adjuster driver 237 provides a control signal, for example a drive current or a drive voltage, to the adjuster 135 to move one or more elements of the microdisplay assembly to achieve a displacement for a focal region calculated by software executing in the processing unit 4 or the hub computer 12 or both. In embodiments of sweeping through a range of displacements and, hence, a' range of focal regions, the variable adjuster driver 237 receives timing signals from the timing generator 226, or alternatively, the clock generator 244 to operate at a programmed rate or frequency. Audio DAC and amplifier 238 receives the audio information from earphones 130. Microphone preamplifier and audio ADC 240 provides an interface for microphone 110. Temperature sensor interface 242 is an interface for temperature sensor 138. Power management unit 202 also provides power and receives data back from three axis magnetometer 132A, three axis gyro 132B and three axis accelerometer 132C.

FIG. 5 is a block diagram describing the various components of processing unit 4. FIG. 5 shows controls circuit 304 in communication with power management circuit 306. Control circuit 304 includes a central processing unit 320, graphics processing unit 322, cache 324, RAM 326, memory control 328 in communication with memory 330 (e.g., D-RAM), flash memory controller 332 in communication with flash memory 334 (or other type of non-volatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication component 346 can include a Wi-Fi enabled communication device, Bluetooth communication device, infrared communication device, etc. The USB port can be used to dock the processing unit 4 to hub computing device 12 in order to load data or software onto processing unit 4, as well as charge processing unit 4. In one embodiment, CPU 320 and GPU 322 are the main workhorses for determining where, when and how to insert virtual images into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (located on the wrist band of processing unit 4). An alternating current to direct current converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. HMD power interface 376 provides power to the head mounted display device 2.

The above-described system will be configured to insert a virtual image into the field of view of a user so that the virtual image appears naturally in-focus or out-of-focus to the user. In various embodiments, the virtual image will be adjusted to match the appropriate orientation, size and shape based on the environment for which the image is being inserted into. In one embodiment, head mounted display device 2, processing unit 4 and hub computing device 12 work together as each of the devices includes a subset of sensors that are used to obtain the data for determining where, when and how to insert the virtual images. In one embodiment, the calculations that determine where, how and when to insert a virtual image are performed by the hub computing device 12. In another embodiment, those calculations are performed by processing unit 4. In another embodiment some of the calculations are performed by hub computing device 12 while other calculations are performed by processing unit 4. In other embodiments, the calculations can be performed by head mounted display device 2.

In one example embodiment, hub computing device 12 will create a model of the environment that the user is in and track various moving objects in that environment. In addition, hub computing device 12 tracks the field of view of the head mounted display device 2 by tracking the position and orientation of head mounted display device 2. The model and the tracking information is provided from hub computing device 12 to processing unit 4. Sensor information obtained by head mounted display device 2 is transmitted to processing unit 4. Processing unit 4 then uses additional sensor information it receives from head mounted display device 2 to refine the field of view of the user and provide instructions to head mounted display device 2 on how, where and when to insert the virtual image.

Figure 6:
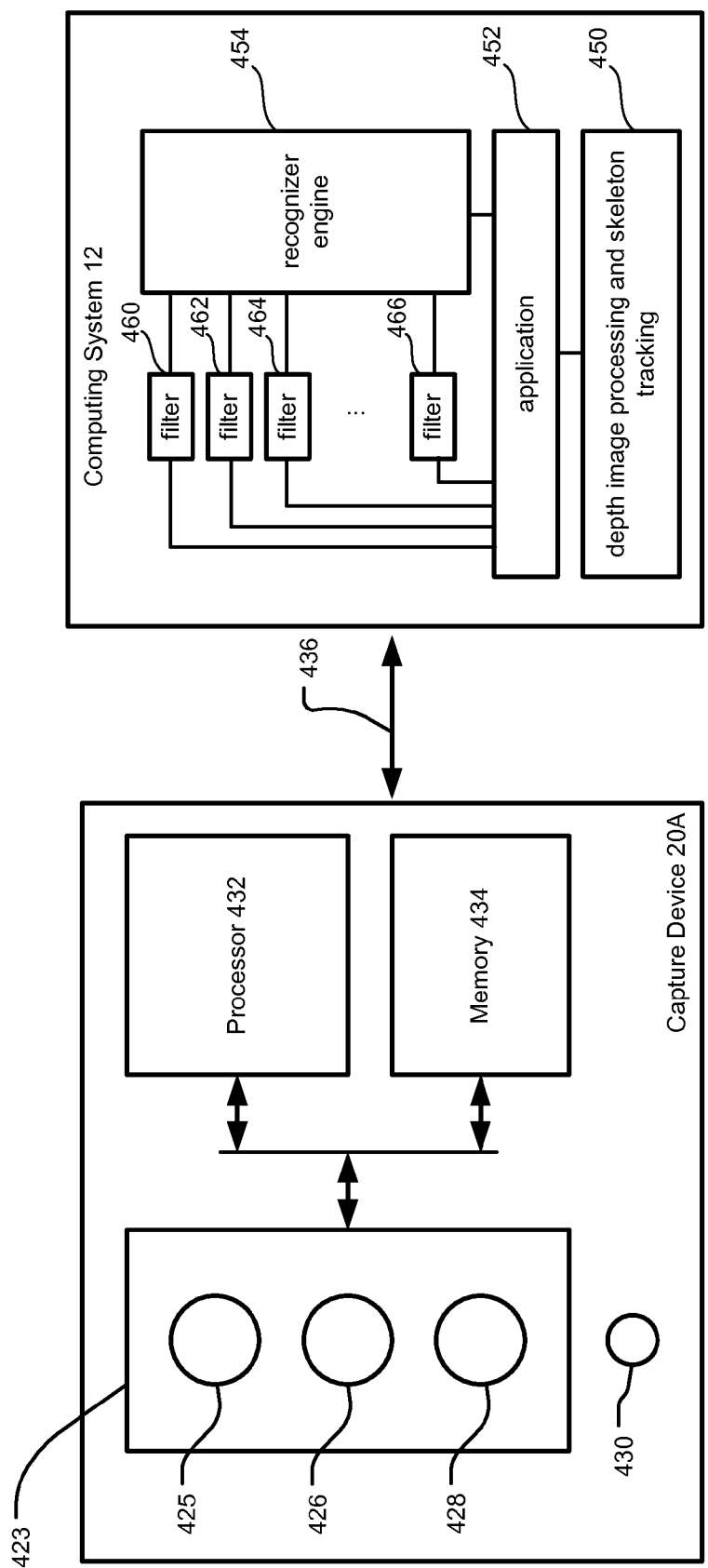
FIG. 6 is a block diagram of one embodiment of the components of a hub computing system used with head mounted display unit.

FIG. 6 illustrates an example embodiment of hub computing system 12 with a capture device. In one embodiment, capture devices 20A and 20B are the same structure, therefore, FIG. 6 only shows capture device 20A.

According to an example embodiment, capture device 20A may be configured to capture video with depth information including a depth image that may include depth values via any suitable technique including, for example, time-of-flight, structured light, stereo image, or the like. According to one embodiment, the capture device 20A may organize the depth information into "Z layers," or layers that may be perpendicular to a Z axis extending from the depth camera along its line of sight.

As shown in FIG. 6, capture device 20A may include a camera component 423. According to an example embodiment, camera component 423 may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 23 may include an infra-red (IR) light component 425, a three-dimensional (3-D) camera 426, and an RGB (visual image) camera 428 that may be used to capture the depth image of a scene. For example, in time-of-flight analysis, the IR light component 425 of the capture device 20A may emit an infrared light onto the scene and may then use sensors (in some embodiments, including sensors not shown) to detect the backscattered light from the surface of one or more targets and objects in the scene using, for example, the 3-D camera 326 and/or the RGB camera 428. In some embodiments, pulsed infrared light may be used such that the time between an outgoing light pulse and a corresponding incoming light pulse may be measured and used to determine a physical distance from the capture device 20A to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20A to a particular location on the targets or objects by analyzing the intensity of the reflected beam of light over time via various techniques including, for example, shuttered light pulse imaging.

In another example embodiment, capture device 20A may use a structured light to capture depth information. In such an analysis, patterned light (i.e., light displayed as a known pattern such as grid pattern, a stripe pattern, or different pattern) may be projected onto the scene via, for example, the IR light component 424. Upon striking the surface of one or more targets or objects in the scene, the pattern may become deformed in response. Such a deformation of the pattern may be captured by, for example, the 3-D camera 426 and/or the RGB camera 428 (and/or other sensor) and may then be analyzed to determine a physical distance from the capture device to a particular location on the targets or objects. In some implementations, the IR Light component 425 is displaced from the cameras 425 and 426 so triangulation can be used to determined distance from cameras 425 and 426. In some implementations, the capture device 20A will include a dedicated IR sensor to sense the IR light, or a sensor with an IR filter.

According to another embodiment, the capture device 20A may include two or more physically separated cameras that may view a scene from different angles to obtain visual stereo data that may be resolved to generate depth information. Other types of depth image sensors can also be used to create a depth image.

The capture device 20A may further include a microphone 430, which includes a transducer or sensor that may receive and convert sound into an electrical signal. Microphone 430 may be used to receive audio signals that may also be provided by to hub computing system 12.

In an example embodiment, the capture device 20A may further include a processor 432 that may be in communication with the image camera component 423. Processor 432 may include a standardized processor, a specialized processor, a microprocessor, or the like that may execute instructions including, for example, instructions for receiving a depth image, generating the appropriate data format (e.g., frame) and transmitting the data to hub computing system 12.

Capture device 20A may further include a memory 434 that may store the instructions that are executed by processor 432, images or frames of images captured by the 3-D camera and/or RGB camera, or any other suitable information, images, or the like. According to an example embodiment, memory 434 may include random access memory (RAM), read only memory (ROM), cache, flash memory, a hard disk, or any other suitable storage component. As shown in FIG. 6, in one embodiment, memory 434 may be a separate component in communication with the image capture component 423 and processor 432. According to another embodiment, the memory 434 may be integrated into processor 432 and/or the image capture component 422.

Capture devices 20A and 20B are in communication with hub computing system 12 via a communication link 436. The communication link 436 may be a wired connection including, for example, a USB connection, a Firewire connection, an Ethernet cable connection, or the like and/or a wireless connection such as a wireless 802.11b, g, a, or n connection. According to one embodiment, hub computing system 12 may provide a clock to capture device 20A that may be used to determine when to capture, for example, a scene via the communication link 436. Additionally, the capture device 20A provides the depth information and visual (e.g., RGB) images captured by, for example, the 3-D camera 426 and/or the RGB camera 428 to hub computing system 12 via the communication link 436. In one embodiment, the depth images and visual images are transmitted at 30 frames per second; however, other frame rates can be used. Hub computing system 12 may then create and use a model, depth information, and captured images to, for example, control an application such as a game or word processor and/or animate an avatar or on-screen character.

Hub computing system 12 includes depth image processing and skeletal tracking module 450, which uses the depth images to track one or more persons detectable by the depth camera function of capture device 20A. Depth image processing and skeletal tracking module 450 provides the tracking information to application 452, which can be a video game, productivity application, communications application or other software application etc. The audio data and visual image data is also provided to application 452 and depth image processing and skeletal tracking module 450. Application 452 provides the tracking information, audio data and visual image data to recognizer engine 454. In another embodiment, recognizer engine 454 receives the tracking information directly from depth image processing and skeletal tracking module 450 and receives the audio data and visual image data directly from capture devices 20A and 20B.

Recognizer engine 454 is associated with a collection of filters 460, 462, 464, ..., 466 each comprising information concerning a gesture, action or condition that may be performed by any person or object detectable by capture device 20A or 20B. For example, the data from capture device 20A may be processed by filters 460, 462, 464, ..., 466 to identify when a user or group of users has performed one or more gestures or other actions. Those gestures may be associated with various controls, objects or conditions of application 452. Thus, hub computing system 12 may use the recognizer engine 454, with the filters, to interpret and track movement of objects (including people).

Capture devices 20A and 20B provide RGB images (or visual images in other formats or color spaces) and depth images to hub computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device. Hub computing system 12 will use the RGB images and depth images to track a user's or object's movements. For example, the system will track a skeleton of a person using the depth images. There are many methods that can be used to track the skeleton of a person using depth images. One suitable example of tracking a skeleton using depth image is provided in U.S. patent application Ser. No. 12/603,437, "Pose Tracking Pipeline" filed on Oct. 21, 2009, Craig, et al. (hereinafter referred to as the '437 Application), incorporated herein by reference in its entirety. The process of the '437 Application includes acquiring a depth image, down sampling the data, removing and/or smoothing high variance noisy data, identifying and removing the background, and assigning each of the foreground pixels to different parts of the body. Based on those steps, the system will fit a model to the data and create a skeleton. The skeleton will include a set of joints and connections between the joints. Other methods for tracking can also be used. Suitable tracking technologies are also disclosed in the following four U.S. Patent Applications, all of which are incorporated herein by reference in their entirety: U.S. patent application Ser. No. 12/475,308, "Device for Identifying and Tracking Multiple Humans Over Time," filed on May 29, 2009; U.S. patent application Ser. No. 12/696,282, "Visual Based Identity Tracking," filed on Jan. 29, 2010; U.S. patent application Ser. No. 12/641,788, "Motion Detection Using Depth Images," filed on Dec. 18, 2009; and U.S. patent application Ser. No. 12/575,388, "Human Tracking System," filed on Oct. 7, 2009.

Recognizer engine 454 includes multiple filters 460, 462, 464, ..., 466 to determine a gesture or action. A filter comprises information defining a gesture, action or condition along with parameters, or metadata, for that gesture, action or condition. For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Parameters may then be set for that gesture. Where the gesture is a throw, a parameter may be a threshold velocity that the hand has to reach, a distance the hand travels (either absolute, or relative to the size of the user as a whole), and a confidence rating by the recognizer engine that the gesture occurred. These parameters for the gesture may vary between applications, between contexts of a single application, or within one context of one application over time.

Filters may be modular or interchangeable. In one embodiment, a filter has a number of inputs (each of those inputs having a type) and a number of outputs (each of those outputs having a type). A first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

Recognizer engine 454 may have a base recognizer engine that provides functionality to the filters. In one embodiment, the functionality that recognizer engine 454 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality for solving particular instances of gesture recognition.

Filters 460, 462, 464, . . . , 466 are loaded and implemented on top of the recognizer engine 454 and can utilize services provided by recognizer engine 454 to all filters 460, 462, 464, . . . , 466. In one embodiment, recognizer engine 454 receives data to determine whether it meets the requirements of any filter 460, 462, 464, . . . , 466. Since these provided services, such as parsing the input, are provided once by recognizer engine 454 rather than by each filter 460, 462, 464, . . . , 466, such a service need only be processed once in a period of time as opposed to once per filter for that period, so the processing used to determine gestures is reduced.

Application 452 may use the filters 460, 462, 464, . . . , 466 provided with the recognizer engine 454, or it may provide its own filter, which plugs in to recognizer engine 454. In one embodiment, all filters have a common interface to enable this plug-in characteristic. Further, all filters may utilize parameters, so a single gesture tool below may be used to debug and tune the entire filter system.

More information about recognizer engine 454 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009, both of which are incorporated herein by reference in their entirety.

Figure 7:
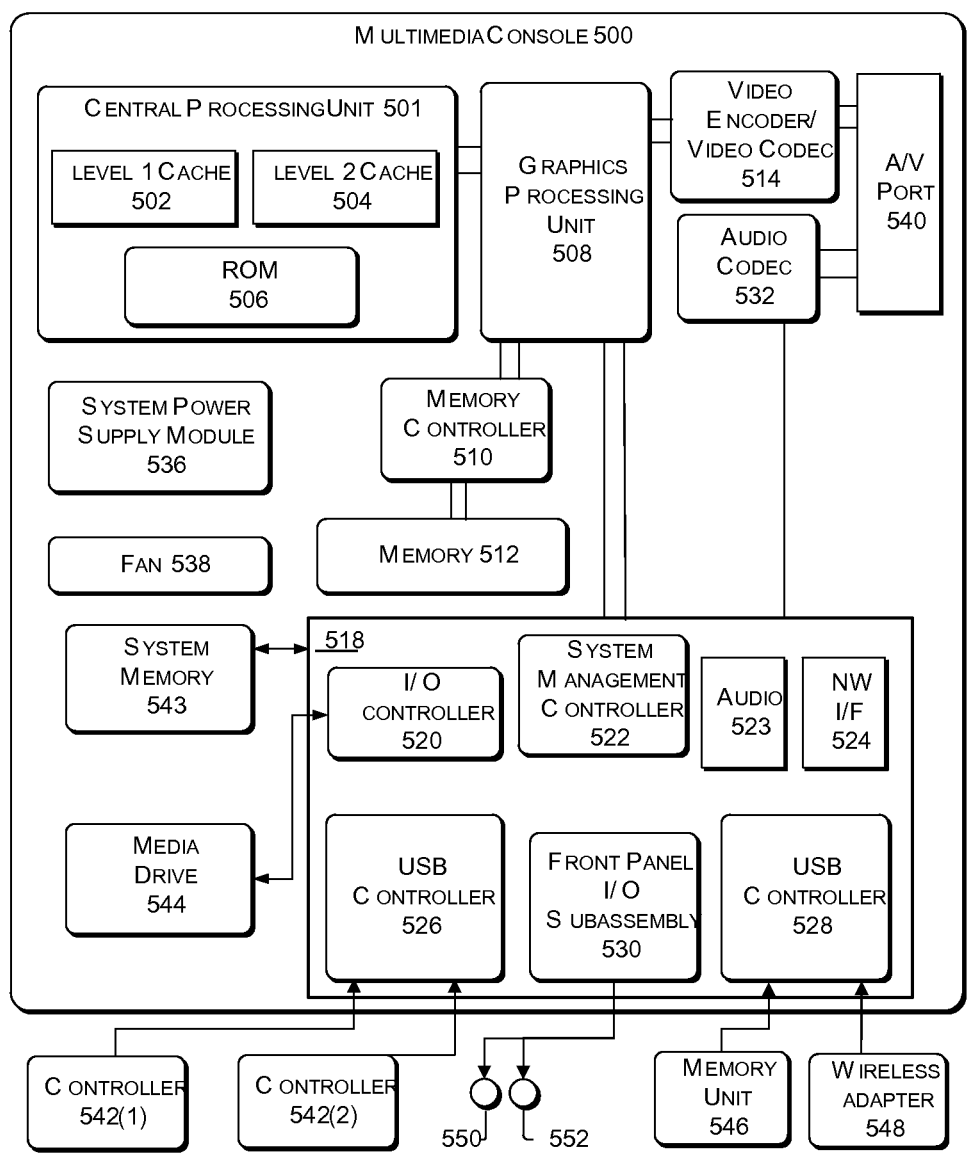
FIG. 7 is a block diagram of one embodiment of a computing system that can be used to implement the hub computing system described herein.

FIG. 7 illustrates an example embodiment of a computing system that may be used to implement hub computing system 12. As shown in FIG. 7, the multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface controller 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 144 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 100. A system power supply module 536 provides power to the components of the multimedia console 100. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

When the multimedia console 500 is powered ON, a set amount of hardware resources are reserved for system use by the multimedia console operating system. These resources may include a reservation of memory, CPU and GPU cycle, networking bandwidth, etc. Because these resources are reserved at system boot time, the reserved resources do not exist from the application's view. In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

After multimedia console 500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture devices 20A and 20B may define additional input devices for the console 500 via USB controller 526 or other interface. In other embodiments, hub computing system 12 can be implemented using other hardware architectures. No one hardware architecture is required.

The example computer systems illustrated in FIGS. 4, 5, 6 and 7 include examples of computer readable storage media. Such media may include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, memory sticks or cards, magnetic cassettes, magnetic tape, magnetic disk storage or other magnetic storage devices, or any other medium which can be used to store the desired information and which can accessed by a computer. Some examples of computer readable storage media in the figures include memory 214 of FIG. 4, flash memory 334, memory 330, RAM 326 and cache 324 of FIG. 5, memory 434 of FIG. 6, and ROM 506, caches 502, 504, memory 512, system memory 543, memory unit 546 and media drive 544.

FIG. 1 depicts one head mounted display device 2 and processing unit 4 (collectively referred to as a mobile display device) in communication with one hub computing device 12 (referred to as a hub). In another embodiment, multiple mobile display devices can be in communication with a single hub. Each of the mobile display devices will communicate with the hub using wireless communication, as described above. In such an embodiment, it is contemplated that much of the information that is useful to all of the mobile display devices will be computed and stored at the hub and transmitted to each of the mobile display devices. For example, the hub will generate the model of the environment and provide that model to all of the mobile display devices in communication with the hub. Additionally, the hub can track the location and orientation of the mobile display devices and of the moving objects in the room, and then transfer that information to each of the mobile display devices.

Figure 8:
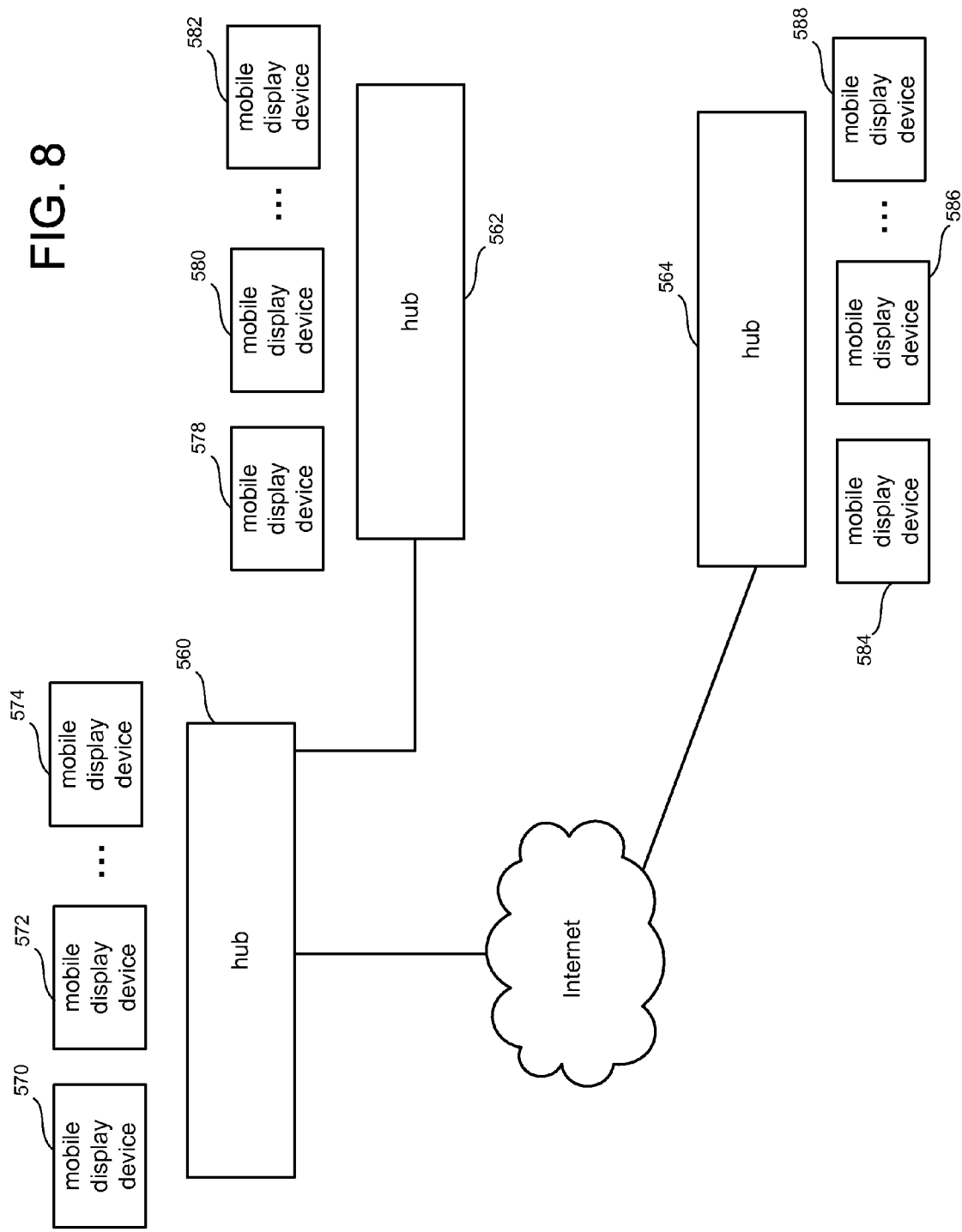
FIG. 8 is a block diagram depicting a multi-user system that can vary the focus of virtual content to be in focus for a user

In another embodiment, a multi-user system that can vary the focus of virtual content to be in focus for a user could include multiple hubs, with each hub including one or more mobile display devices. The hubs can communicate with each other directly or via the Internet (or other networks). For example, FIG. 8 shows hubs 560, 562 and 564. Hub 560 communicates directly to hub 562. Hub 560 communicates to hub 564 via the Internet. Hub 560 communicated with mobile display devices 570, 572, . . . , 574. Hub 562 communicates with mobile display device 578, 580, . . . , 582. Hub 564 communicates with mobile display device 584, 586, . . . , 588. Each of the mobile display devices communicate with their respective hub via wireless communication as discussed above. If these hubs are in a common environment, then each of the hubs can provide a portion of the model of the environments, or one hub can create the model for the other hubs. Each of the hubs will track a subset of moving objects and share that information with the other hubs, which will in turn share the information with the appropriate mobile display devices. Sensor information for the mobile display devices will be provided to their respective hubs and then shared to the other hubs for eventual sharing to the other mobile display devices. Thus, information shared between hubs can include skeleton tracking, information about the models, various states of applications, and other tracking. The information communicated between the hubs and their respective mobile display devices include tracking information of moving objects, the state and physics updates for the world models, geometry and texture information, video and audio, and other information used to perform the operations described herein.

Figure 9:
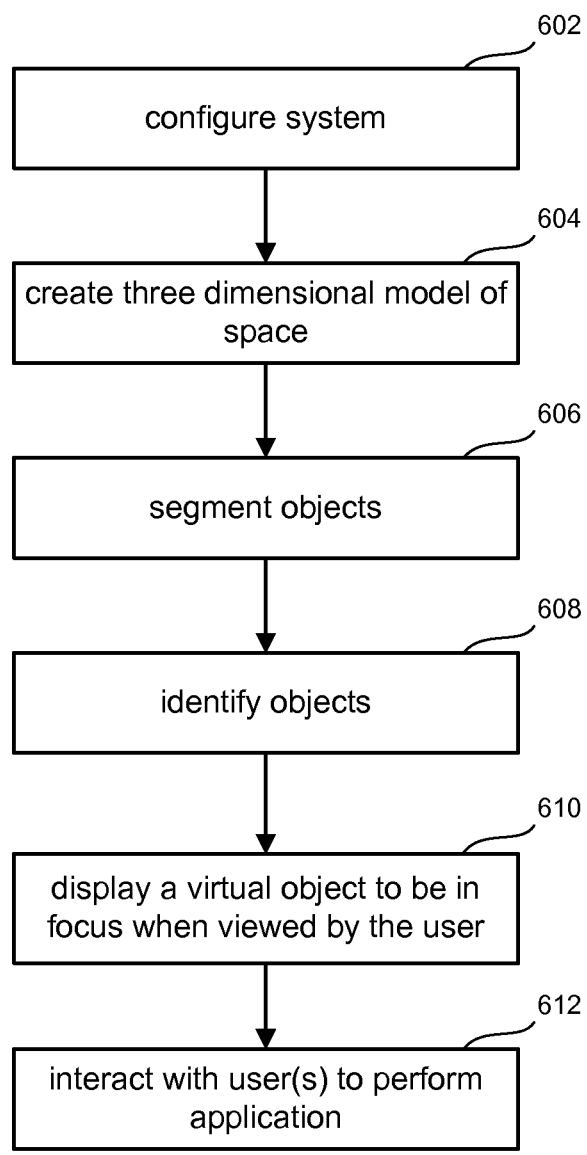
FIG. 9 is a flowchart describing one embodiment of a process for displaying a virtual object to be in focus when viewed by the user.

FIG. 9 is a flowchart describing one embodiment of a process for displaying a virtual object to be in focus when viewed by the user that is performed by the components discussed above. In step 602, the system is configured. For example, an application (e.g., application 452 of FIG. 6) can configure the system to indicate that a particular virtual image (representing a virtual object) is to be inserted into the three dimensional model of the scene, at a designated location. Consider an example where an empty room is populated with virtual objects to turn the empty room into a virtual reality. In another example, an application running on hub computing system 12 will indicate that a particular virtual image (representing a virtual object) is to be inserted into the scene as part of a video game or other process.

In step 604, the system will create a volumetric model of the space for which head mounted display device 2 is located. In one embodiment, for example, hub computing device 12 will use depth images from one or more depth cameras to create a three dimensional model of the environment or space in which head mounted display device 2 is located. In steps 606, that model is segmented into one or more objects. For example, if hub computing device 12 creates a three dimensional model of a room, that room is likely to have multiple objects in it. Examples of objects that can be in a room include persons, chairs, tables, couches, etc. Step 606 includes determining distinct objects from each other. In step 608, the system will identify the objects. For example, hub computing device 12 may identify that a particular object is a table and another object is a chair. In step 610, the system will display a virtual object to be in focus when viewed by a user. The virtual object appears in-focus as if it were a real object being actually and directly viewed through the see-through lenses, e.g. 116, 118s. That is, the system displays a virtual image in the field of view of the user at the focal depth the user is viewing while the user is looking through the head mounted display device 2. Thus, the virtual image will appear at its real world location on a display device that allows actual direct viewing of at least a portion of the physical environment through that display. The virtual object can be a stationary object or a moving object. In step 612, the user of head mounted display device 2 will interact with an application running on hub computing device 12 (or another computing device) based on the virtual object being displayed in the head mounted display device 2. Each of the steps 604-610 will be described in more detail below.

FIG. 10 is a flowchart describing one embodiment of a process for creating a three dimensional model of the space. For example, the process of FIG. 10 is one example implementation of step 604 of FIG. 9. In step 640, hub computing system 12 receives one or more depth images for multiple perspectives of the space that the head mounted display device 2 is in. For example, hub computing device 12 can obtain depth images from multiple depth cameras, or multiple depth images from the same camera by pointing the camera in different directions or using a depth camera with a lens that allows a full view of the space for which a model will be built. In step 642, depth data from the various depth images are combined based on a common coordinate system. For example, if this system receives depth images from multiple cameras, the system will correlate the two images to have a common coordinate system (e.g., line up the images). In step 644, a volumetric description of the space is created using the depth data. In step 646, the system will detect and track moving objects such as humans moving in the room. More detail about tracking people is described above. In step 648, the volumetric description of the space is updated based on the tracking of the moving objects. Steps 646 and 648 can be performed continuously during operation of the system such that the model is continuously updated by taking into account the moving objects. In another embodiment, the model will only include information about stationary objects and the moving objects are tracked separately.

FIG. 11 is a flowchart describing one embodiment of a process for segmenting the model of the space into objects. For example, the process of FIG. 11 is one example implementation of step 606 of FIG. 9. In step 680 of FIG. 11, the system will receive one or more depth images from one or more depth camera as discussed above. Alternatively, the system can access one or more depth images that it has already received. In step 682, the system will receive one or more visual images from the cameras described above. Alternatively, the system can access one or more visual images already received. In step 684, hub computing system will detect one or more people based on the depth images and/or visual images. For example, the system will recognize one or more skeletons. In step 686, hub computing device will detect edges within the model based on the depth images and/or the visual images. In step 688, hub computing device will use the detected edges to identify distinct objects from each other. For example, it is assumed that edges are boundaries between objects. In step 690, the model created using the process of FIG. 10 will be updated to show which portions of the model are associated with different objects.

FIG. 12 is a flowchart describing one embodiment of a process for identifying objects. For example, the process of FIG. 12 is one example implementation of step 608 of FIG. 9. In step 710, hub computing device 12 will match identified people to user identities. For example, the system may have user profiles that have visual images that can be matched to the images detected of the objects. Alternatively, a user profile can describe features of the person which can be match based on the depth images or visual images. In another embodiment, users may log into the system and hub computing device 12 can use the login process to identify a particular user and track that user throughout the interaction described herein. In step 712, hub computing device 12 will access the database of shapes. In step 714, hub computing device will match as many objects in the model to the shapes in the database. In step 716, those shapes that are unmatched will be highlighted and displayed to the user (e.g., using monitor 16). In step 718, hub computing device 12 will receive user input that identifies each (or a subset) of the shapes highlighted. For example, the user can use a keyboard, mouse, speech input, or other type of input to indicate what each unidentified shape is. In step 720, the database of shapes is updated based on the user input in step 718. In step 722, the model of the environment created in step 604, and updated in step 606, is further updated by adding metadata for each of the objects. The metadata identifies the object. For example the metadata may indicate that the particular object is a round shiny table, John Doe, green leather couch, etc.

Figure 13:
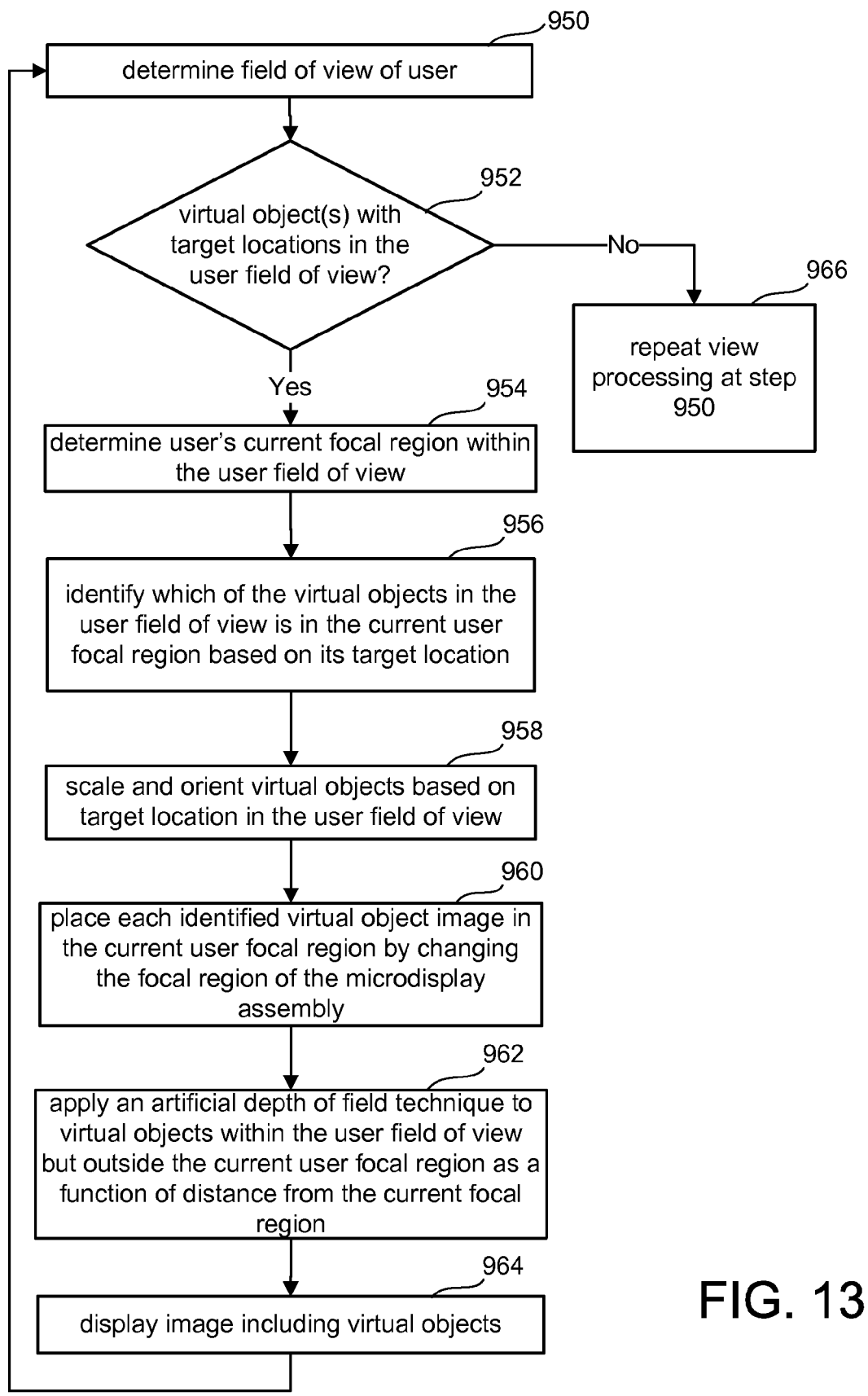
FIG. 13 is a flowchart describing one embodiment of a process for displaying a virtual object to be in focus when viewed by a user viewing a see-through display.

FIG. 13 is a flowchart describing one embodiment of a process for displaying a virtual object to be in focus when viewed by a user viewing a see-through display. For example, the process of FIG. 13 is one example implementation of step 610 of FIG. 9. In step 950 of FIG. 13, the system determines the field of view of the user. That is, the system determines what portion of the environment or space the user is looking at. In one embodiment, it is a collaborative effort using hub computing device 12, processing unit 4 and head mounted display device 2. In one example implementation, hub computing device 12 will track the user and the head mounted display device 2 in order to provide a preliminary determination of location and orientation of head mounted display device 2. Sensors on the head mounted display device 2 will be used to refine the determined orientation. For example, the inertial sensors 34, described above, can be used to refine the orientation of head mounted display device 2. Additionally, the eye tracking process described above can be used to identify a subset of the initially determined field of view that corresponds to where in particular a user is looking otherwise known as the user focal region or depth focus in the field of view. More details will be described below with respect to FIGS. 14, 15 and 16.

The types of virtual objects and their location in a user field of view is determined by the application 452 based on default parameters, user input, or a combination of both. For example, a user may have selected a real world object of a coffee table in the room where he is running the application 452 to appear as a boulder. The virtual boulder's target location will be related to the location of the coffee table in the three dimensional model. In another example, a virtual dolphin may be selected by a user to swim around the room. The motion of the dolphin virtually around the room may be implemented by a trajectory path of the dolphin object in which a target location for the dolphin is updated in each display frame. Even if a user stares at the boulder, the dolphin will likely come in and out of the user's focal region and field of view generally. As the user moves his or her eyes or head, the user field of view and current focal region is updating with these movements as well. One or more virtual objects may be located in the user focal region and user field of view at any given time.

After determining the field of view in step 950 above, the system determines whether there are any target locations of virtual objects in the user's current field of view in step 952. Software executing in one or more computer systems such as the hub computing device 12 or the processing unit 4 will identify the location of the target in the field of view. In one embodiment, hub computing device 12 will provide the model to processing unit 4. As part of step 952, processing unit 4 will use the model of the environment and knowledge of the position and orientation of the user to determine whether the target location of any virtual object is within the user's field of view.

If there are no virtual objects in the user's current field of view, the processing in step 966 returns to determining and updating the user's field of view in step 950.

If there is at least one virtual object having a target location in the user's field of view, then in step 954, the system such as software executing in processing unit 4, determines the user's current focal region within the user's field of view. As discussed further below in FIGS. 15 and 16, eye tracking processing based on data captured by the eye tracking camera 134 for each eye, can provide the current focal region of the user. For example, the convergence between the pupils with data indicating the face position of the user can be used to triangulate to a focal point on a focal curve, the Horopter, from which the focal region, the Panum's fusional area can be calculated. The Panum's fusion area is the area of single vision for binocular stereopsis used by human eyes.

In step 956, software executing in the hub computer system 12, the processing unit 4 or both identifies which of the virtual objects in the user field of view is in the current user focal region based on the target location of the virtual object in the model.

In step 958, processing unit 4 will scale and orient the virtual objects for an image to be inserted into the user's view. The scaling and orienting of the virtual image will be based on the location of the target in the field of view and the known shape of the virtual object based on the model.

In step 960, processing unit 4, control circuitry 136 or both sharing processing to place each identified virtual object in the current user focal region by changing the focal region of the microdisplay assembly. In step 962, an artificial depth of field technique is applied to virtual objects whose target locations are within the user's field of view but outside the user's current focal region as a function of distance from the current focal region. An example of an artificial depth of field technique is an artificial blur technique.

Artificial blur can be achieved by applying a depth of field shader or other a Gaussian blur filter to simulate the object being out of focus as function of distance from the focal region. The technique may be performed in whole or in part by software executing on the hub computer 12, the processing unit 4 or both. For ease of description, reference will be made to the processing unit 4. From a depth value as part of the target location of a virtual object, the focal distance of the object in the image is determined by the processing unit 4 which also determines which pixels on a display element 112 like that enclosing the lightguide optical element 112 will map to the virtual objects in an image. Based on the focal distance, one or more weighted Gaussian blur filters are applied to cover at least two dimensions by convolving the image with a Gaussian function such that the transformations applied to pixels further from the focal point or fixation point of the image are will receive more blurring effects. In one example, the Gaussian blur filter acts as a low pass filter removing high frequency information.

In step 964, a virtual image including the virtual objects in the user field of view is displayed. In one example, the processing unit 4 sends instructions to display driver 220 of control circuitry 136 for display on microdisplay 120 of the virtual image including the virtual objects in the user field of view. The lens system 122 then projects the virtual image received from the microdisplay 120 onto the reflecting surface 124 and towards the user's eyes or into the lightguide optical element 112 for viewing by the user. In one implementation, the display the user is looking through in the head mounted display device (e.g., the lightguide optical element 112) is divided into pixels. Step 964 may include determining which pixels correspond to the target location, and those pixels will display the virtual images in step 964. The opacity filter 114 may be used to prevent unrealistic visual effects. For example, the opacity filter 114 can modify light to pixels in the lightguide optical element 112 so that a background virtual object is not seen through a foreground virtual object. Processing returns to step 950 and determining the user field of view again in this real time display system. The processing steps of FIG. 13 can be performed continuously during operation of the system such that the user field of view and user focal region are updated as the user moves his or her head, and the virtual objects may be displayed as naturally moving in and out of focus for the user accordingly.

Figure 14:
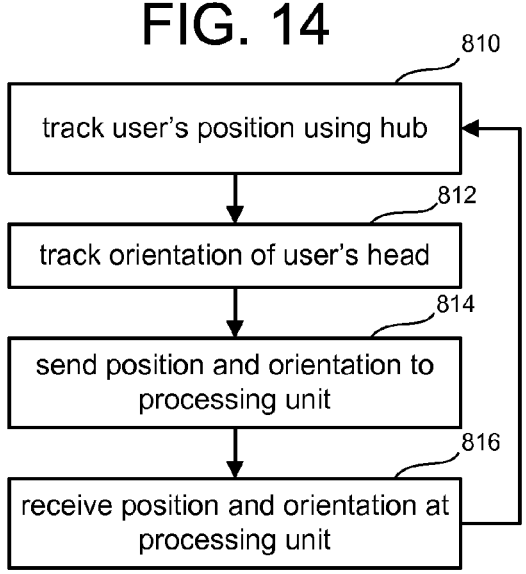
FIG. 14 is a flow chart describing one embodiment of a process for the hub tracking the position and orientation of a user and/or the head mounted display unit.
Figure 15:
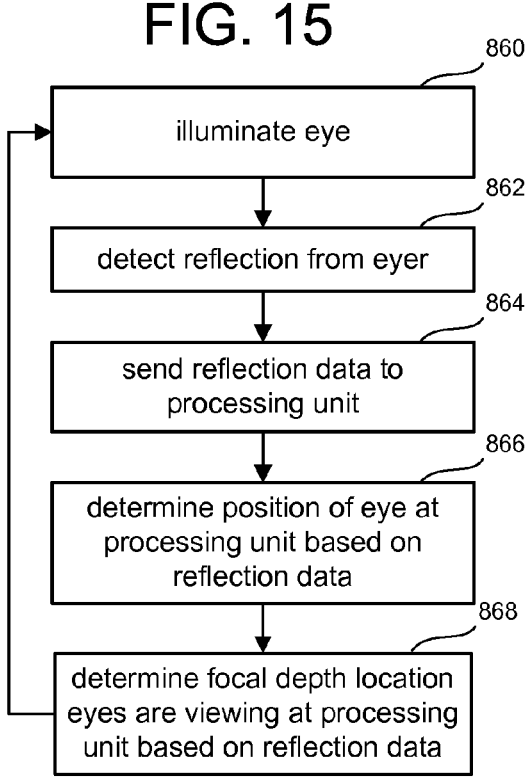
FIG. 15 is a flow chart describing one embodiment of a process for tracking the position of an eye.
Figure 16:
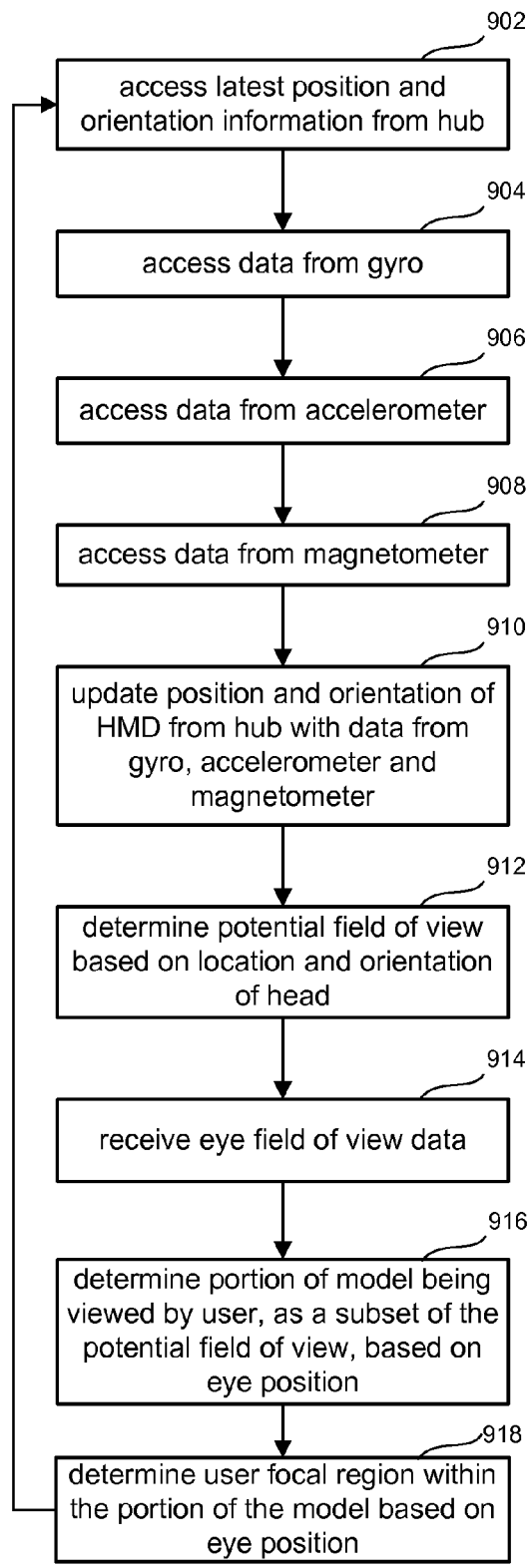
FIG. 16 is a flow chart describing one embodiment of a process for determining the field of view of a user.

FIG. 16 is a flowchart describing one embodiment of a process for determining the field of view a user, which is an example implementation of step 950 of FIG. 13. The process of FIG. 16 relies on information from the hub computing device 12 and the eye tracking technology described above. FIG. 14 is a flowchart describing one embodiment of a process performed by the hub computing system to provide tracking information used in the process of FIG. 16. FIG. 15 is a flowchart describing one embodiment of a process for tracking an eye, the results of which are used by the process of FIG. 16.

In step 810 of FIG. 14, the hub computing device 12 will track the user's position. For example, hub computing device 12 will use one or more depth images and one or more visual images to track a user (e.g., using skeleton tracking). One or more depth images and one or more visual images can be used to determined the position of the head mounted display device 2 and the orientation of the head mounted display device 2 in step 812. In step 814, the position and orientation of the user and the head mounted display device 2 are transmitted from the hub computing device 12 to processing unit 4. In step 816, the position and orientation information is received at processing unit 4. The processing steps of FIG. 14 can be performed continuously during operation of the system such that the user is continuously tracked.

FIG. 15 is a flowchart describing one embodiment for tracking an eye using the technology described above. In step 860, the eye is illuminated. For example, the eye can be illuminated using infrared light from eye tracking illumination 144A. In step 862, the reflection from the eye is detected using one or more eye tracking cameras 134B. In step 864, the reflection data is sent from head mounted display device 2 to processing unit 4. In step 866, processing unit 4 will determine the position of the eye based on the reflection data, as discussed above. In step 868, processing unit 4 will also determine the focal depth location or focal region the user's eyes are viewing based on the reflection data. The processing steps of FIG. 15 can be performed continuously during operation of the system such that the user's eyes are continuously tracked providing data for tracking the current user focal region.

FIG. 16 is a flowchart describing one embodiment of a process for determining the field of view (e.g., step 950 of FIG. 13). In step 902, processing unit 4 will access the latest position and orientation information received from the hub. The process of FIG. 14 can be performed continuously as depicted by the arrow from step 814 to step 810, therefore, processing unit 4 will periodically receive updated position and orientation information from hub computing device 12. However, processing unit 4 will need to draw the virtual image more frequently than it receives the updated information from hub computing device 12. Therefore, processing unit 4 will need to rely on information sensed locally (e.g., from the head mounted device 2) to provide updates to the orientation in between samples from hub computing device 12. In step 904, processing unit 4 will access data from three axis gyro 132B. In step 906, processing unit 4 will access data from three axis accelerometer 132C. In step 908, processing unit 4 will access data from three axis magnetometer 132A. In step 910, processing unit 4 will refine (or otherwise update), the position and orientation data from hub computing device 12 with the data from the gyro, accelerometer and magnetometer. In step 912, processing unit 4 will determine the potential field of view based on the location and orientation of head mounted display device.

In step 914, processing unit 4 will access the latest eye position information. In step 916, processing unit 4 will determine a portion of the model being viewed by the user, as a subset of the potential field of view, based on eye position. For example, the user may be facing a wall and, therefore, the field of the view for the head mounted display could include anywhere along the wall. However, if the user's eyes are pointed to the right, then step 916 will conclude that the field of view of the user is only the right hand portion of the wall. At the conclusion of step 916, processing unit 4 has determined the field of view of the user through head mounted display 2. Processing unit 4 can identify a target location of a virtual object within that field of view. In step 918, processing unit 4 determines the current user focal region with the portion of the model based on eye position. Processing unit 4 can identify a target location in the model of a virtual object that is within the current user focal region. The processing steps of FIG. 16 can be performed continuously during operation of the system such that the user's field of view and focal region are continuously updated as the user moves his or her head, and the virtual objects may be displayed as naturally moving in and out of focus for the user accordingly.

Figure 17A:
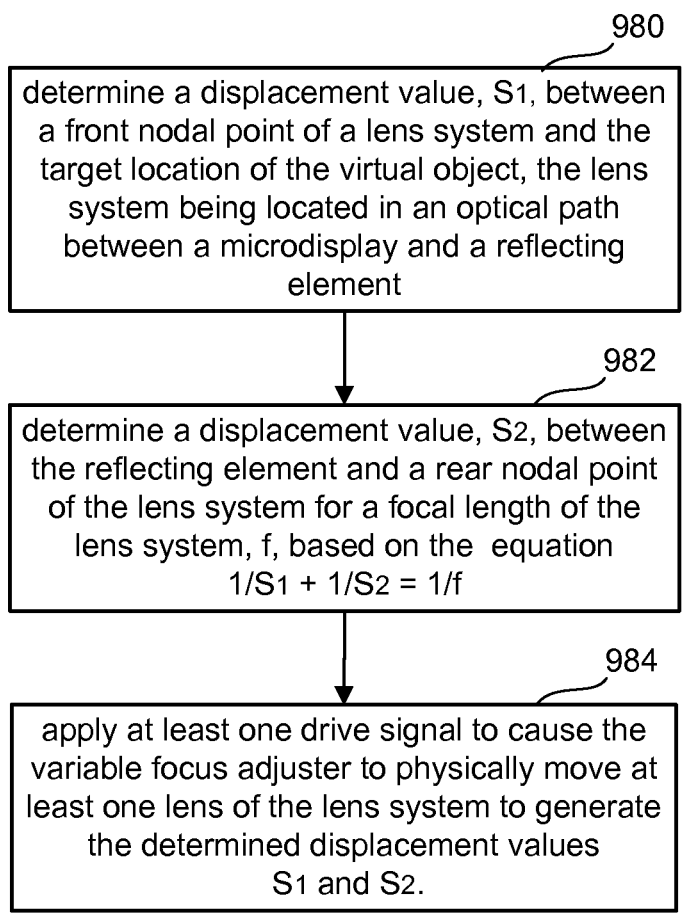
FIG. 17A is a flowchart describing one embodiment of a process for changing a focal region of a microdisplay assembly by displacing at least one lens of the assembly.

FIG. 17A is a flowchart describing one embodiment of a process for changing a focal region of a microdisplay assembly by displacing at least one lens of the assembly. This embodiment may be used to implement step 960 in FIG. 13. For an illustrative context, a microdisplay assembly as described previously with respect to FIGS. 2A and 2B is referenced. The microdisplay assembly comprises the microdisplay unit 120 aligned in an optical path 133 with a lens system 122 which collimates the image light from the microdisplay unit 120 to the reflecting element 124 or reflecting elements 124a, 124b and either into the user's eyes or another optical element 112. The microdisplay assembly also includes the variable virtual focus adjuster 135 for physically moving one of the light processing elements to obtain a selected or determined focal region.

Before the discussions of FIGS. 3A-3D, the microdisplay assembly displacements and focal lengths are related by the following equation $1/S_1+1/S_2=1/f$. In step 980, the processing unit 4 determines a displacement value, $S_1$, between a front nodal point of the lens system 122 and the target location of the virtual object. Additionally, in step 982, the processing unit 4 determines a displacement value, $S_2$, between the reflecting element 124, 124a and the rear nodal point of the lens system for a focal length of the lens system, f, based on the equation. The processing unit 4 causes in step 984 the processor of the control circuitry 136 to cause the variable adjuster driver 237 to apply at least one drive signal to the variable virtual focus adjuster 135 to physically move at least one lens of the lens system to generate the determined displacement values $S_1$ and $S_2$. Besides the microdisplay assembly shown in FIGS. 2A and 2B, another implementation is a microdisplay assembly using the insertable lens system example of FIG. 3D. The movement is that of releasing an arm 123 for a lens if in place and moving an arm 123 for the lens at the determined displacement to lock the lens in the optical path 133.

Figure 17B:
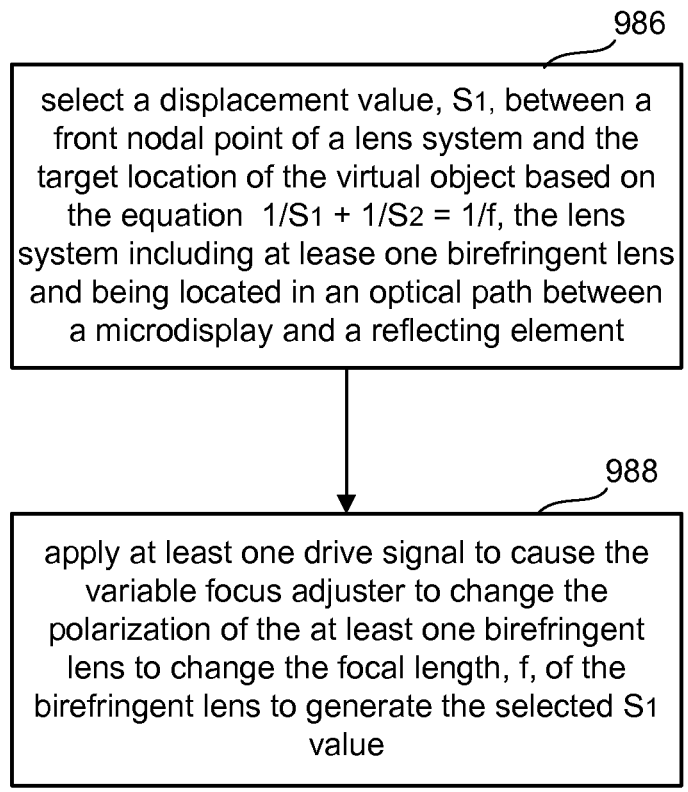
FIG. 17B is a flowchart describing one embodiment of a process for changing a focal region of a microdisplay assembly by changing a polarization of at least one lens of the assembly.

FIG. 17B is a flowchart describing one embodiment of a process for changing a focal region of a microdisplay assembly by changing a polarization of at least one lens of the assembly. This embodiment may be used to implement step 960 in FIG. 13 and is suitable for use with the embodiment of a microdisplay assembly such as that shown in FIG. 3C. In this embodiment, the lens system includes at least one birefringent lens in the optical path between the microdisplay 120 and the reflecting element 124 (FIG. 2A), 124a (FIG. 2B). In step 986, the processing unit 4 selects a displacement value for $S_1$ based on a target location of a virtual object and the equation $1/S_1+1/S_2=1/f$. In step 988, the variable adjuster driver 237 applies at least one drive signal to cause the variable focus adjuster 135 to change the polarization of the at least one birefringent lens to change the focal length, f, of the birefringent lens to generate the selected $S_1$ value. Since each birefringent lens has two discrete focal lengths corresponding to two polarization axes, a combination of two such lenses gives a selection of four discrete focal lengths. Thus, under the control of software, the processing unit 4 or the processor 210 of control circuitry 136 selects the closest available focal length to approximate the value of f. For each birefringent lens added, the number of discrete focal lengths doubles.

FIG. 17C is a flowchart describing one embodiment of a process for changing a focal region of a microdisplay assembly by changing a radius of curvature of at least one fluid lens of the assembly. This embodiment may be used to implement step 960 in FIG. 13 and is suitable for use with the embodiment of a microdisplay assembly employing at least one liquid lens in its lens system 122 such as that shown in FIGS. 3B1 and 3B2. In step 990, the processing unit 4 selects a displacement value for $S_1$ based on a target location of a virtual object and the equation $1/S_1+1/S_2=1/f$. In step 992, the variable adjuster driver 237 applies at least one drive signal to cause the variable focus adjuster 135 to cause a volume change in the fluid of the fluid lens causing a change in its radius of curvature to change its focal length, f, to generate the selected $S_1$ value As mentioned above in the embodiment of FIG. 13, for the virtual objects in the user field of view but not in the focal region of the user, artificial blur techniques may be applied. In other embodiments, a series of images at different focal regions may be generated. By moving through a range of foci or focal regions and displaying an image at each focal region, the user can be made to see an image composed of layers of different focal region images. When the user readjusts his or her focus, the user will settle on one of those regions, and virtual objects in the rest of the regions will be naturally blurred. The sweeping through a range of focal regions may be done at a predetermined rate or frequency. This is done rapidly enough so that human temporal image fusion will make them all appear to be present at once. The need for artificial depth of field techniques such as artificial blur will be reduced, although the rendering load may increase significantly.

The movement through a range of focal regions can be implemented in one embodiment by changing the displacement between light processing elements of the microdisplay assembly or the optical power of a light processing element in the assembly at a rate of speed. The rate of speed may be at least as much as a frame rate of 30 frames per second (fps), but can be in some embodiments at a higher rate of speed such as 60, 120 or 180 Hz. A lens which is displaced along an optical axis at a high rate of speed providing images at different focal regions is sometime referred to as a vibrating lens or an oscillating lens. In some instances, the image region, for example the reflecting surface 124, 124a, is moved rather than a lens system 122 or the image source 120, but the principal is the same.

Figure 18A:
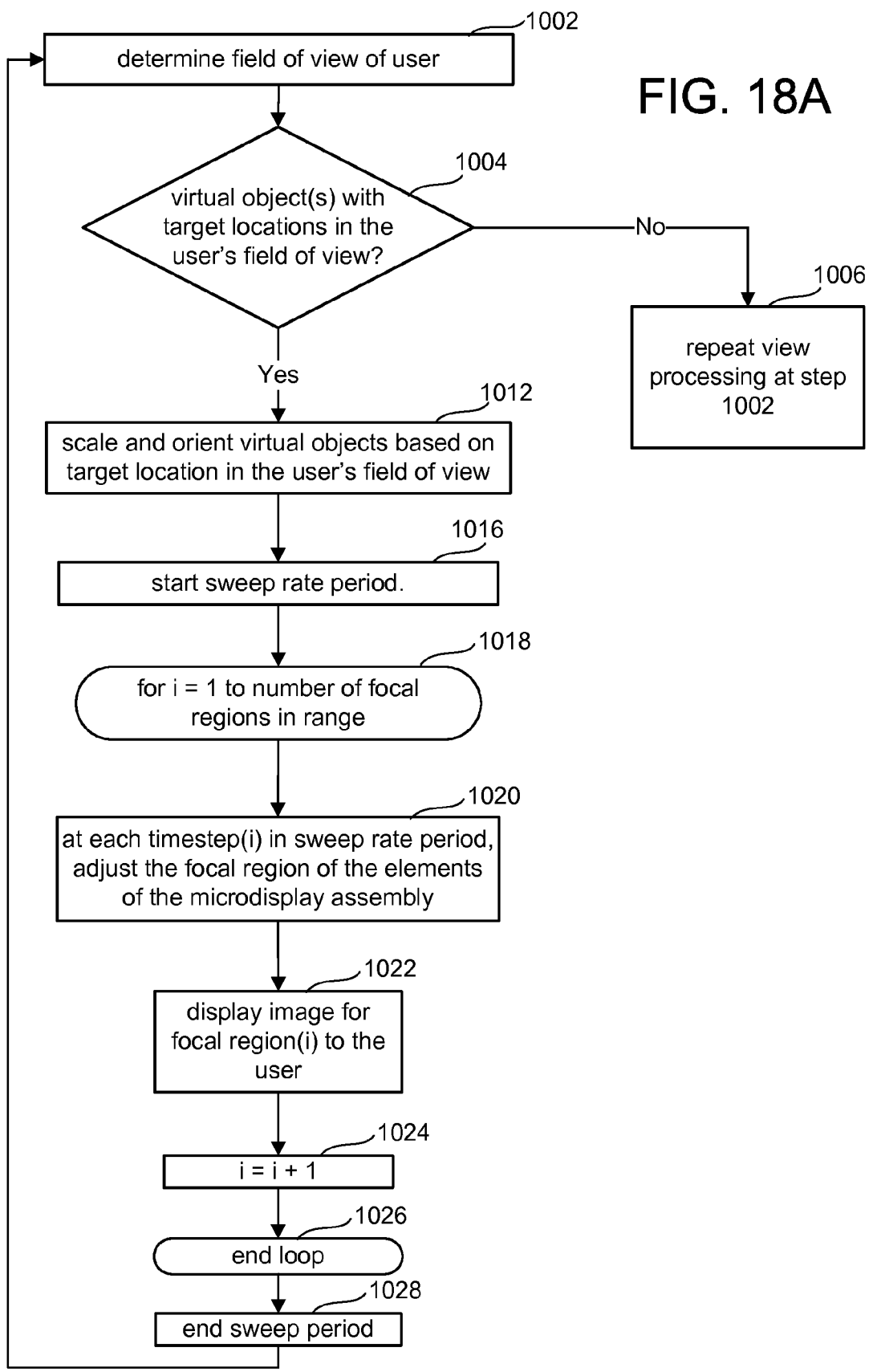
FIG. 18A is a flow chart describing one embodiment of a process for generating virtual object images in different focal regions in an augmented reality display.

FIG. 18A is a flow chart describing one embodiment of a process for generating virtual object images in different focal regions in an augmented reality display that may be used to implement step 610 in FIG. 9. In step 1002 of FIG. 18A, the hub computing device 12 or the processing unit 4 or both under the control of software determines the field of view of the user like in step 950 of FIG. 13, and determines in step 1004 whether there are any target locations of virtual objects in the user's current field of view like in step 952. Similar to step 966. If there are no virtual objects in the user's current field of view, the processing in step 1006 returns to determining and updating the user's field of view in step 1002.

Like in step 958, processing unit 4 will scale and orient the virtual objects for an image to be inserted into the user's view in step 1012. The scaling and orienting of the virtual image will be based on the location of the target in the field of view and the known shape of the virtual object based on the model.

In step 1016, a sweep rate period is started by the timing generator 226 or clock generator 244 of the control circuitry. In step 1018 a counter is initialized to go through a number of focal regions in the range during the sweep period. In some instances, the focal regions are predetermined. At each timestep of the sweep period, the focal region of the elements of the microdisplay assembly are adjusted, and an image is displayed for each focal region at its sweeptime or timestep to the user in step 1022. The next focal region is selected in step 1024 by incrementing the counter, and the processing of steps 1020 through 1024 are repeated until the counter indicates the range sweep is complete. The sweep period ends in step 1028. In other examples, an end of frame for a display may interrupt a sweep through the sweep range, and another sweep begin with the next frame.

In one embodiment, the rendering load may be reduced by rendering a subset of focal regions and using tracking of the user focal region to optimize which focal regions are selected for rendering. In other examples, the eye tracking data does not provide sufficient precision to determine the depth of focus location the user is viewing. Inference logic may infer an object on which the user is focused. Once an object is selected as the object of focus, the three dimensional model or mapping of the current scene may be used to determine the distance to the object of focus.

FIG. 18B illustrates another embodiment of a process for displaying a virtual object to be in focus when viewed by a user viewing an augmented reality display that may be used to implement step 610 in FIG. 9. FIG. 18B is a flow chart describing one embodiment of a process for generating virtual object images in different focal regions in an augmented reality display. In step 1002 of FIG. 18B, the hub computing device 12 or the processing unit 4 or both under the control of software determines the field of view of the user like in step 950 of FIG. 13, and determines in step 1004 whether there are any target locations of virtual objects in the user's current field of view like in step 952. Similar to step 966. If there are no virtual objects in the user's current field of view, the processing in step 1006 returns to determining and updating the user's field of view in step 1002.

If there is at least one virtual object having a target location in the user's field of view, then in step 1008 like in step 954, the system such as software executing in processing unit 4, determines the user's current focal region within the user's field of view, and like in step 956, software executing in the hub computer system 12, the processing unit 4 or both identifies in step 1010 which of the virtual objects in the user field of view is in the current user focal region based on the target location of the virtual object in the model. Like in step 958, processing unit 4 will scale and orient the virtual objects for an image to be inserted into the user's view in step 1012. The scaling and orienting of the virtual image will be based on the location of the target in the field of view and the known shape of the virtual object based on the model.

In step 1014, the processing unit 4 selects a range of focal regions including the current user focal region. The processing unit 4 may select the range of focal regions based on criteria such as the context of the executing application, e.g. 452. An application may use a selection of virtual objects with predetermined motion trajectories and events which trigger their appearance. As the model of objects is updated with the movement of objects, the processing unit 4 receives these updates as per the discussion of FIG. 10. In between updates, the processing unit 4 may use the sensor data on position and orientation of the user's head to determine which virtual objects he or she is likely focusing on at the time. The processing unit 4 may select a number of focal regions in which the trajectory of the virtual object will travel based on the three dimensional model of the scene. Therefore, one example criteria is to include each focal region in which a virtual object is located. In addition, focal regions may also be selected in which regions the trajectory of a moving virtual object will be in a predetermined time frame. The predetermined time frame may be until the next update of model data indicating the exact locations of virtual objects in one example.

The starting focal region point for sweeping through the range of focal regions may be the one closest to infinity in the user field of view from the user's eyes. Other starting locations may be used, however, starting at infinity may simplify application of the opacity filter 114. In step 1016, a sweep rate period is started by the timing generator 226 or clock generator 244 of the control circuitry. In step 1018 a counter is initialized to go through a number of focal regions in the range during the sweep period. In some instances, the focal regions are predetermined. At each timestep of the sweep period, the focal region of the elements of the microdisplay assembly are adjusted, and an image is displayed for each focal region at its sweeptime or timestep to the user in step 1022. The next focal region is selected in step 1024 by incrementing the counter, and the processing of steps 1020 through 1024 are repeated until the counter indicates the range sweep is complete. The sweep period ends in step 1028. In other examples, an end of frame for a display may interrupt a sweep through the sweep range, and another sweep begin with the next frame.

Figure 19A:
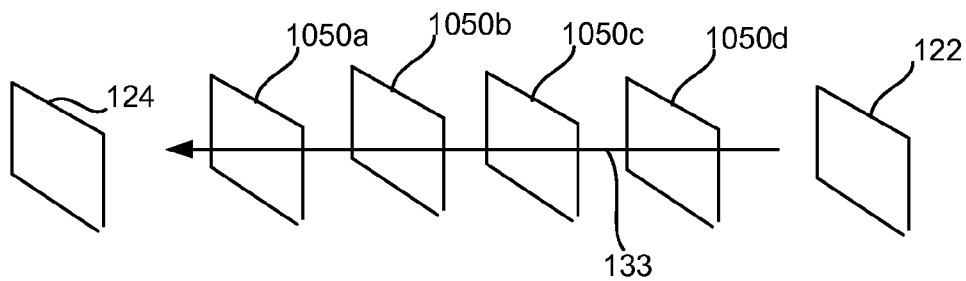
FIGS. 19A and 19B illustrate schematically examples of the different ways of displaying multi-focus virtual objects in an augmented reality display.
Figure 19B:
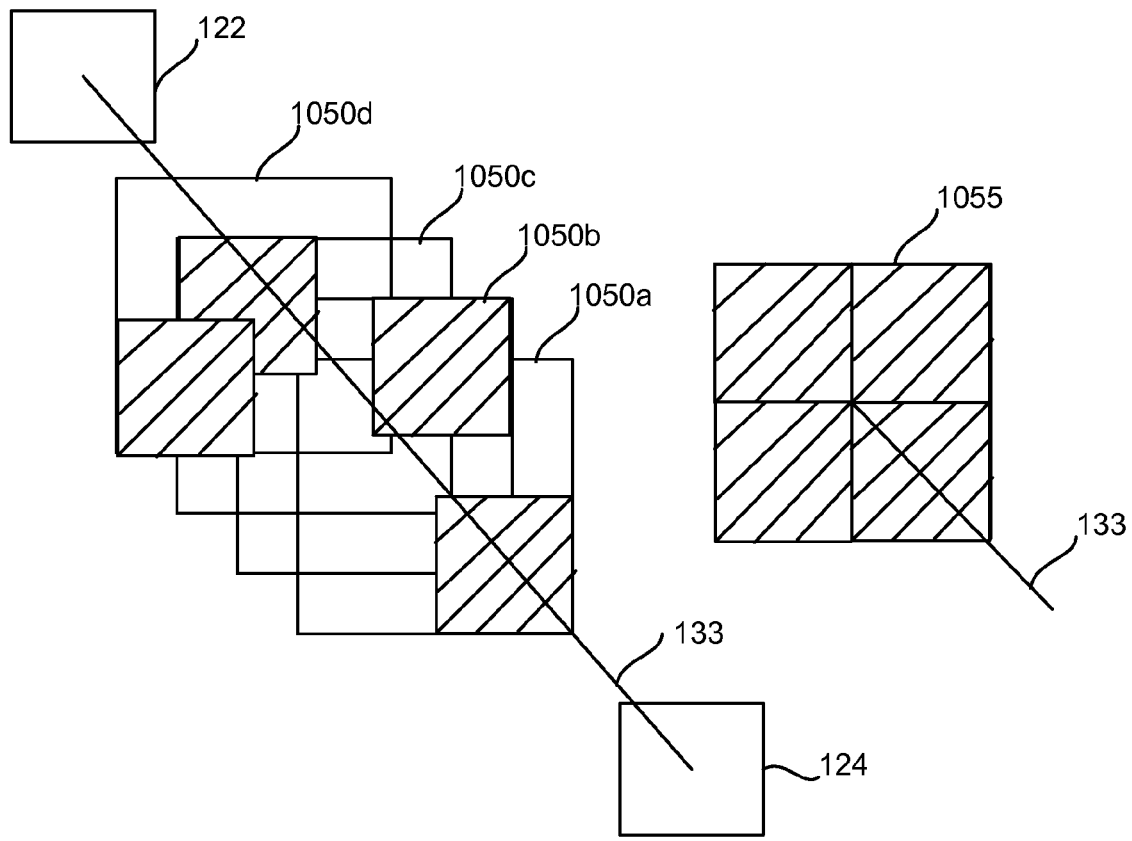

FIGS. 19A and 19B illustrate schematically examples of the different ways of displaying multi-focus virtual objects in an augmented reality display. In FIG. 19A, an example of four images 1050a through 1050d are generated at different focal regions generated at different displacements in the optical path 133 of the microdisplay assembly, and all the images are sent for display on the lightguide optical element 112. In FIG. 19B, the processing unit 4 causes a section or portion of each image which is in focus at that focal or image region to be included in a composite image 1055 for display on display 112. The section and portion of each image which is in focus in one example can be the portion where the virtual object is located in the image at the time it was generated.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for displaying virtual objects with variable focus by an augmented reality system comprising:
   identifying by one or more processors a three dimensional location of one or more virtual objects within a user field of view of a near-eye display device of the augmented reality system, the near-eye display device comprising a microdisplay assembly and a display unit optically coupled to receive one or more images from the microdisplay assembly, the microdisplay assembly including one or more light processing elements including at least one optical element and a microdisplay unit aligned in an optical path with the at least one optical element;
   determining by the one or more processors a three dimensional current focal region of a user wearing the near-eye display device within the user field of view;
   identifying which of the one or more virtual objects are in the current focal region of the user based on the three dimensional locations of the one or more virtual objects within the user field of view;
   adjusting a focal region of a the microdisplay assembly for generating image data in the current focal region by moving a position of the one or more light processing elements in the optical path of the microdisplay assembly under control of the one or more processors;
   generating a series of layered image data at different focal regions, by the microdisplay assembly, for each of the one or more virtual objects, such that the one or more virtual objects identified as being in the current focal region at the adjusted focal region are generated in focus and the one or more virtual objects outside of the focal region are generated blurred; and
   receiving from the microdisplay assembly and displaying by the display unit the generated image data of the one or more virtual objects.

2. The method of claim 1, wherein determining by the one or more processors a three dimensional current focal region of a user wearing the near-eye display device within the user field of view further comprises:
   determining the three dimensional current focal region of the user based on a Panum's fusional area.

3. The method of claim 1, further comprising:
   applying at least one artificial depth of field technique to a virtual object which is within the user field of view but outside the current focal region of the user as a function of distance from the current focal region.

4. An augmented reality system providing variable focus of virtual objects comprising:
   a near-eye support structure;
   one or more processors;
   a see-through display unit positioned by the near-eye support structure to be seen through by a user eye;
   a microdisplay assembly for generating one or more images, supported by the near-eye support structure and optically coupled to the see-through display unit for outputting image data for a current user focal region to the see-through display unit, the microdisplay assembly includes one or more light processing elements including a microdisplay, at least one optical element, and a variable virtual focus adjuster, the at least one optical element and the microdisplay being aligned in an optical path, the variable virtual adjuster changing the focal region of the microdisplay assembly to place one or more virtual objects in a current focal region of a user by moving a position of the one or more light processing elements in the optical path under control of the one or more processors;
   an armature for supporting at least one light processing element of the microdisplay assembly and stabilizing movement of the at least one light processing element moving along the optical path;
   the one or more processors controlling the microdisplay assembly for generating image data at the changed focal region of the one or more virtual objects in the current focal region; and
   the display unit receiving the generated image data from the microdisplay assembly and displaying the generated image data including a driver to control the variable virtual adjuster, the processor under the control of software directing the microdisplay to include at least one virtual object in a current user focal region; and
   a display optically coupled to the microdisplay assembly via the optical path for displaying three dimensional virtual images.

5. The augmented reality system of claim 4, wherein the armature is under the control of the variable virtual adjuster.

6. The augmented reality system of claim 4, wherein the variable virtual adjuster is a piezoelectric actuator.

7. The augmented reality system of claim 4, further comprising a timing generator, under control of the one or more processors, for providing a rate to a driver controlling the variable virtual adjuster;
   the variable virtual adjuster moving at least one light processing element of the microdisplay assembly at the rate through a range of displacements in the optical path of the microdisplay assembly, the range of displacements corresponding to a range of focal regions;

the range of focal regions including a focal region at which image generated by the microdisplay results in image data being displayed by the display unit at the current user focal region; and the one or more processors directing the microdisplay to generate an image including any virtual object identified to be located in a respective focal region of the range when the respective displacement in the range of displacements is reached.

8. The augmented reality system of claim 4, wherein:
the at least one optical element of the microdisplay assembly comprises a set of insertable lenses and the variable virtual adjuster comprises a respective arm for moving each insertable lens in the set into and out of the optical path; and
the variable virtual adjuster changing the focal region of the microdisplay assembly to place one or more virtual objects in a current focal region of a user by moving the one or more light processing elements in the optical path under control of one or more processors further comprises moving the respective arm for moving a position of a respective insertable lens in the set with respect to the optical path for changing the focal region.

9. The augmented reality system of claim 4, wherein:
the at least one optical element of the microdisplay assembly comprises a set of lenses in a rotatable support under control of the variable virtual adjuster; and
the variable virtual adjuster changing the focal region of the microdisplay assembly to place one or more virtual objects in a current focal region of a user by moving the one or more light processing elements in the optical path under control of one or more processors further comprises the variable virtual adjuster rotating the rotatable support to change a lens of the set of lenses in the optical path for changing the focal region.

10. The augmented reality system of claim 7, wherein the display unit projects the images generated by the range of displacements to the at least one eye location.

11. The augmented reality system of claim 7, wherein the microdisplay generates a composite image including in-focus portions of the different images generated by the range of displacements, and
the display unit projects the composite image to the at least one eye location.

12. The augmented reality system of claim 7 further comprising:
one or more cameras supported by the near-eye support structure for capturing image data and depth data of one or more real objects in front of the user; and
a memory accessible to the one or more processors for storing the image data and the depth data; and
the one or more processors, generating a three-dimensional model of an augmented reality scene based on locations of one or more real objects derived from the image data and the depth data captured by the cameras and locations of one or more virtual objects based on an executing software application.

13. The augmented reality system of claim 12 further comprising an orientation sensor and an eye tracking unit supported by the near-eye support structure;
the one or more processors determining the field of view of the user based on the three dimensional model, and data from the orientation sensor and eye position data from the eye tracking unit, identifying target locations of any virtual object within the user field of view, determining which focal region any target location of any virtual object is within, and selecting the range of focal regions based on the current user focal region and a motion trajectory of any virtual object within the user field of view controlled by the executing application.

14. One or more computer readable non-volatile storage media having encoded thereon instructions for causing a processor to perform a method for displaying virtual objects with variable focus by an augmented reality system, the method comprising:
identifying by one or more processors a three dimensional location of one or more virtual objects within a user field of view of a near-eye display device of the augmented reality system, the near-eye display device comprising a microdisplay assembly and a display unit optically coupled to receive one or more images from the microdisplay assembly, the microdisplay assembly including one or more light processing elements including at least one optical element and a microdisplay unit aligned in an optical path with the at least one optical element, and the at least one optical element of the microdisplay assembly comprises a set of insertable lenses such that changing a lens of the set of lenses in the optical path changes the focal region;
determining by the one or more processors a three dimensional current focal region of a user wearing the near-eye display device within the user field of view;
identifying which of the one or more virtual objects are in the current focal region of the user based on the three dimensional locations of the one or more virtual objects within the user field of view;
adjusting a focal region of the microdisplay assembly for generating image data in the current focal region by moving a position of the one or more light processing elements in the optical path of the microdisplay assembly under control of the one or more processors;
generating image data, by the microdisplay assembly, of the one or more virtual objects identified as being in the current focal region at the adjusted focal region; and
receiving from the microdisplay assembly and displaying by the display unit the generated image data of the one or more virtual objects.

15. The method of claim 1, wherein moving the one or more light processing elements in the optical path of the microdisplay assembly under control of the one or more processors further comprises:
determining by the one or more processors a displacement value, S1, between a front nodal point of the at least one optical element and a target location of at least one virtual object, the at least one optical element being located in an optical path between a microdisplay and a reflecting element,
determining by the one or more processors a displacement value, S2, between the reflecting element and a rear nodal point of the at least one optical element for a focal length of the at least one optical element, f, based on the equation $1/S1+1/S2=1/f$, and
moving the at least one optical element under control of the one or more processors to generate the determined displacement values S1 and S2.

16. The augmented reality system of claim 4, wherein moving the one or more light processing elements in the optical path under control of the one or more processors further comprises:
determining by the one or more processors a displacement value, S1, between a front nodal point of the at least one optical element and a target location of at least one virtual object, the at least one optical element being located in an optical path between a microdisplay and a reflecting element, determining by the one or more processors a displacement value, S2, between the reflecting element and a rear nodal point of the at least one optical element for a focal length of the at least one optical element, f, based on the equation $1/S1+1/S2=1/f$, and moving the at least one optical element under control of the one or more processors to generate the determined displacement values S1 and S2.

17. The one or more computer readable non-volatile storage media of claim 14, the method further comprising:

wherein moving the one or more light processing elements in the optical path of the microdisplay assembly under control of the one or more processors further comprises:

determining by the one or more processors a displacement value, S1, between a front nodal point of the at least one optical element and a target location of at least one virtual object, the at least one optical element being located in an optical path between a microdisplay and a reflecting element, determining by the one or more processors a displacement value, S2, between the reflecting element and a rear nodal point of the at least one optical element for a focal length of the at least one optical element, f, based on the equation $1/S1+1/S2=1/f$, and moving the at least one optical element under control of the one or more processors to generate the determined displacement values S1 and S2.

\* \* \* \* \*